US012780670B2

(12) United States Patent
De Pooter et al.

(10) Patent No.: US 12,780,670 B2
(45) Date of Patent: Nov. 3, 2026

(54) VERTICALLY INTEGRATED MANUFACTURING OF SILICA AEROGELS FROM VARIOUS SILICA SOURCES

(71) Applicant: AEROBEL BV, Bilzen (BE)

(72) Inventors: Steve De Pooter, Heist-op-den-Berg (BE); Stephen A. Steiner, III, Milwaukee, WI (US); Justin S. Griffin, Watertown, MA (US)

(73) Assignee: AEROBEL BV, Bilzen (BE)

( * ) Notice: Subject to any disclaimer, the term of this patent is extended or adjusted under 35 U.S.C. 154(b) by 611 days.

(21) Appl. No.: 18/039,657

(22) PCT Filed: Dec. 1, 2021

(86) PCT No.: PCT/EP2021/083714
§ 371 (c)(1),
(2) Date: May 31, 2023

(87) PCT Pub. No.: WO2022/117618
PCT Pub. Date: Jun. 9, 2022

(65) Prior Publication Data

US 2024/0002241 A1 Jan. 4, 2024

Related U.S. Application Data

(60) Provisional application No. 63/119,801, filed on Dec. 1, 2020.

(51) Int. Cl.
*C01B 33/158* (2006.01)

(52) U.S. Cl.
CPC ...... *C01B 33/1585* (2013.01); *C01P 2006/12* (2013.01); *C01P 2006/32* (2013.01); *C01P 2006/90* (2013.01)

(58) Field of Classification Search
CPC ............. C01B 33/1585; C01P 2006/12; C01P 2006/32; C01P 2006/90
See application file for complete search history.

(56) References Cited

U.S. PATENT DOCUMENTS

| | | | | |
|---|---|---|---|---|
| 2006/0239886 | A1* | 10/2006 | Nakayama | B01J 19/123 423/335 |
| 2017/0165943 | A1* | 6/2017 | Kim | B32B 5/022 |
| 2018/0162737 | A1 | 6/2018 | Choi et al. | |
| 2019/0276322 | A1* | 9/2019 | Kim | C01B 33/1585 |

OTHER PUBLICATIONS

Okoronkwo, E. A., P. E. Imoisili, and S. O. O. Olusunle. "Extraction and characterization of amorphous silica from corn cob ash by sol-gel method." Chemistry and materials research 3.4 (2013): 68-72.*

(Continued)

*Primary Examiner* — Richard M Rump
(74) *Attorney, Agent, or Firm* — Morgan, Lewis & Bockius LLP

(57) ABSTRACT

Silica aerogels, and associated methods of manufacture, are generally described. The present invention generally describes vertically integrated manufacturing of silica aerogels from various silica sources.

20 Claims, 1 Drawing Sheet

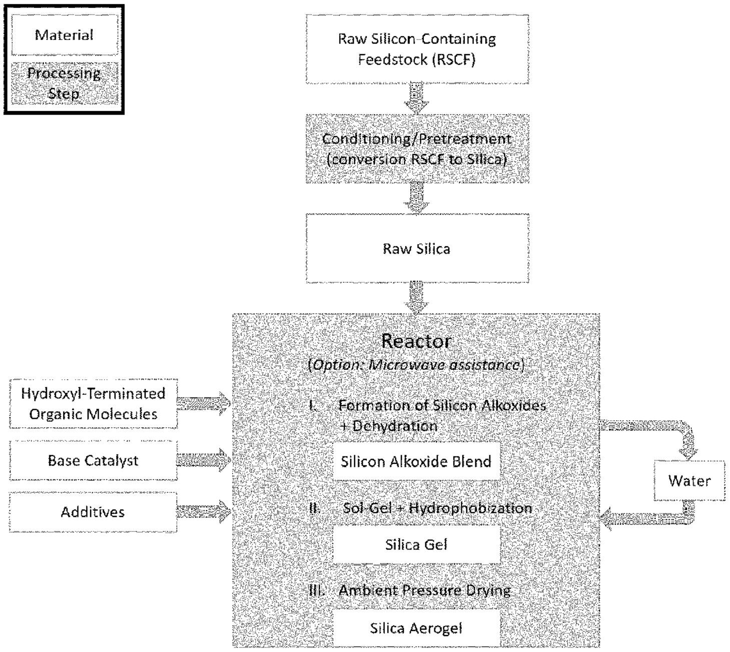

(56) References Cited

OTHER PUBLICATIONS

Kaya, Gulcihan Guzel, Elif Yilmaz, and Huseyin Deveci. "Synthesis of sustainable silica xerogels/aerogels using inexpensive steel slag and bean pod ash: A comparison study." Advanced Powder Technology 31.3 (2020): 926-936.*

Abbas, et al., "Silica aerogel derived from rice husk: an aggregate replacer for lightweight and thermally insulating cement-based composites," Construction and Building Materials, vol. 195, pp. 312-322, 2019.

Al-Oweini, et al., "Synthesis and characterization by FTIR spectroscopy of silica aerogels prepared using several Si(OR)4 and R"Si(OR')3 precursors," Journal of Molecular Structure, vol. 919, Nos. 1-3, pp. 140-145. Feb. 2009.

Fukaya, et al., "Direct synthesis of tetraalkoxysilanes from silica and alcohols," New J. Chem, vol. 41, pp. 2224-2226, 2017.

International Search Report & Written Opinion PCT Application No. PCT/EP2021/083714, dated Jun. 9, 2022, 14 pages.

Shirini, et al., "Rice Husk Ash: A New, Cheap, Efficient, and Reusable Reagent for the Protection of Alcohols, Phenols, Amines, and Thiols," Phosphorus, Sulfur, and Silicon, vol. 189, pp. 577-589, 2014.

Singh, et al., "Utilization of secondary agricultural products for the preparation of value added silica materials and their important applications: a review, " Journal of Sol-Gel Science and Technology, vol. 96, pp. 15-33, 2020.

Temnikov, et al., "Comparison of Effectiveness of Various Approaches to Direct Synthesis of Alkoxysilanes," Silicon, vol. 7, pp. 69-78, 2015.

Koc, et al., "Tuning the properties of silica aerogels through pH controlled sol-gel processes," Res. Eng. Struct. Mater., 2020; 6(3): 257-269.

* cited by examiner

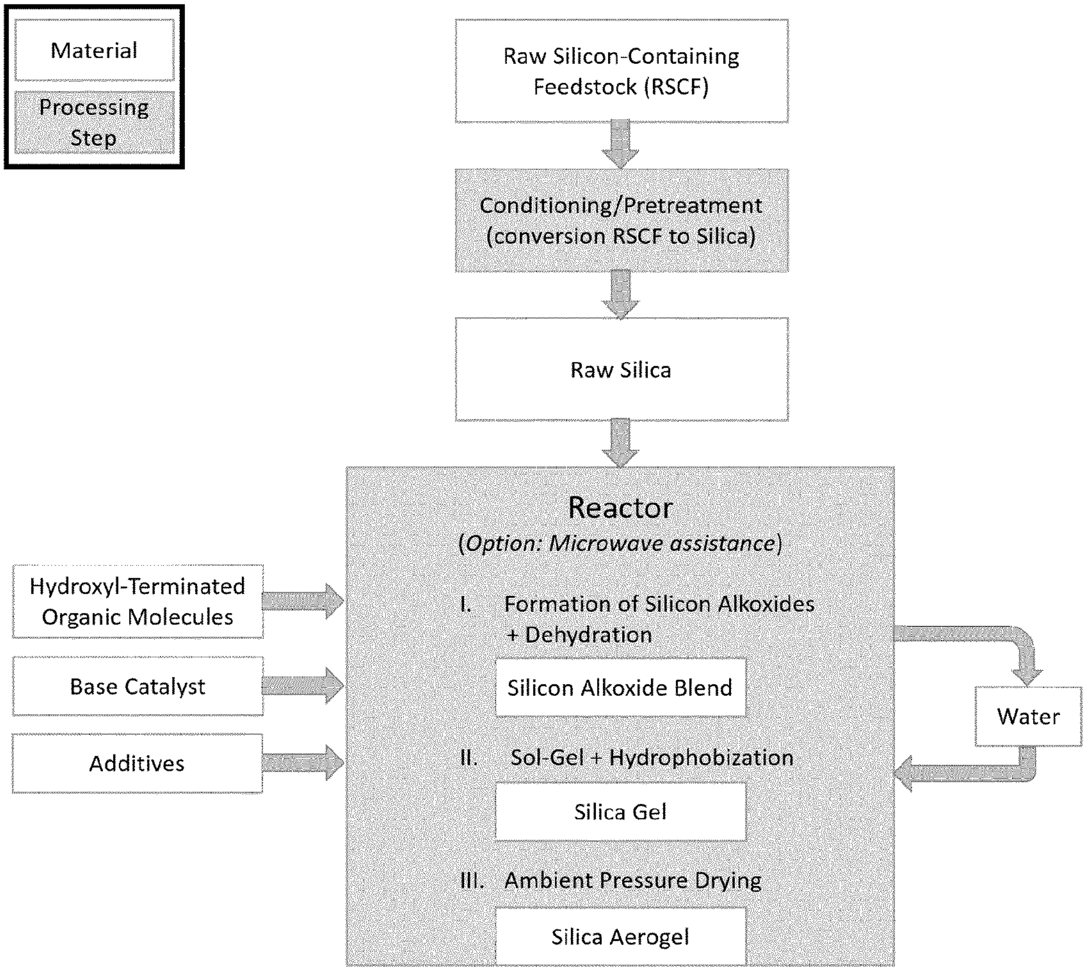

Material
Processing Step
Raw Silicon-Containing Feedstock (RSCF)
Conditioning/Pretreatment (conversion RSCF to Silica)
Raw Silica
Reactor
(Option: Microwave assistance)
Hydroxyl-Terminated Organic Molecules
Base Catalyst
Additives
I. Formation of Silicon Alkoxides + Dehydration
Silicon Alkoxide Blend
II. Sol-Gel + Hydrophobization
Silica Gel
III. Ambient Pressure Drying
Silica Aerogel
Water

VERTICALLY INTEGRATED MANUFACTURING OF SILICA AEROGELS FROM VARIOUS SILICA SOURCES

CROSS REFERENCE TO RELATED APPLICATIONS

This present application is the U.S. national stage of International Patent Application No. PCT/EP2021/083714, filed Dec. 1, 2021, which claims the benefit of and priority to U.S. Provisional Application No. 63/119,801, filed Dec. 1, 2020, the contents of each are hereby incorporated by reference in their entireties.

TECHNICAL FIELD

Silica aerogels, and associated methods of manufacture, are generally described.

SUMMARY

Silica aerogels, and associated methods of manufacture, are generally described. The present invention generally describes vertically integrated manufacturing of silica aerogels from various silica sources. The subject matter of the present invention involves, in some cases, interrelated products, alternative solutions to a particular problem, and/or a plurality of different uses of one or more systems and/or articles.

In a first aspect, the present invention provides a method for manufacturing an aerogel, the method comprising

- reacting a silica source with one or more hydroxyl-containing organic molecules, thereby forming a silicon alkoxide;
- hydrolyzing the silicon alkoxide;
- forming a silica gel from the hydrolyzed silicon alkoxide; and
- drying the silica gel to produce an aerogel.

In another aspect, the present invention provides a silica aerogel that is obtained or obtainable from a silica source by a method as disclosed herein. In certain embodiments, the present invention provides a silica aerogel comprising one or more hydrophobic side groups, the hydrophobic side groups comprising at least an alkoxy group and/or a fatty acid ester group.

In some embodiments, the present invention comprises a method for manufacturing a silica aerogel, the method comprising reacting a silica source with one or more hydroxyl-containing organic molecules, thereby forming a silicon alkoxide; hydrolyzing the silicon alkoxide; forming a silica gel from the hydrolyzed silicon alkoxide; and drying the silica gel to produce an aerogel. In certain embodiments, the method may comprise providing the silica source.

In some embodiments, a method as provided herein further comprises recovering a hydroxyl-containing organic molecule resulting from hydrolysis of the silicon alkoxide, resulting from formation of the silica gel, resulting from excess addition, and/or resulting from the extraction of the pore liquid of the silica gel during drying, and using the recovered hydroxyl-containing organic molecule to make another silicon alkoxide. Hence, for example, so-recovered hydroxyl-containing organic molecule(s), optionally supplemented with fresh hydroxyl-containing organic molecule(s), which may be the same or different, may be reacted with a further amount of a silica source to result in a further amount of silicon alkoxide.

In some embodiments, a silica aerogel as provided herein comprises one or more hydrophobic side groups. In some embodiments, the hydrophobic groups may be selected from the group comprising an alkoxy group, a carboxylic acid ester group (—O(C=O)R group), a fatty acid ester group (—O(C=O)R group, in which R is an aliphatic chain typifying a fatty acid), and mixtures thereof.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying FIGURES, which are schematic and are not intended to be drawn to scale. In the FIGURES, each identical or nearly identical component illustrated is typically represented by a single numeral. For purposes of clarity, not every component is labeled in every FIGURE, nor is every component of each embodiment of the invention shown where illustration is not necessary to allow those of ordinary skill in the art to understand the invention.

The figures are described in-line below.

FIG. 1 depicts a schematic illustration of an embodiment of a vertically integrated aerogel manufacturing procedure as disclosed herein, comprising the main processing steps and main materials used and formed during the manufacturing.

DETAILED DESCRIPTION

The present invention generally describes a vertically integrated manufacturing of silica aerogels from various silica sources. FIG. 1 depicts a schematic illustration of an embodiment of this vertically integrated aerogel manufacturing procedure, comprising the main processing steps and main materials used and formed during the manufacturing.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. That is, these terms do not exclude additional, non-recited members, elements or method steps. Only the transitional phrases "consisting of" and "consisting essentially of" shall be closed or semi-closed transitional phrases, respectively, as set forth in the United States Patent Office Manual of Patent Examining Procedures, Section 2111.03.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

The term "about" as used herein when referring to a measurable value such as a parameter, an amount, a temporal duration, and the like, is meant to encompass variations of and from the specified value, in particular variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

As used throughout the present disclosure, the terms "weight %" or "% w/w" or "% by weight" are used interchangeably and refer to the weight concentration of a constituent, i.e. the weight of a constituent divided by the total weight of all constituents.

All references cited in the present specification are hereby incorporated by reference in their entirety. In particular, the teachings of all references herein specifically referred to are incorporated by reference.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. In some embodiments, a silica aerogel may be manufactured by reacting silica derived from a silica-containing feedstock. In some embodiments, the silica may be reacted with one or more hydroxyl-containing organic molecules to form an alkoxide blend. Hence, when silicon alkoxides are discussed in the present specification, the specification may typically concern blends of silicon alkoxides resulting from the recited reactions. In some embodiments, the alkoxide blend may be formed in the presence of one or more catalysts. In some embodiments, the alkoxide blend may be converted to a sol-gel material. In some embodiments, the silica sol-gel may be subsequently dried to a silica aerogel. In some embodiments, reacting the silica source with one or more hydroxyl-containing organic molecules; forming a silicon alkoxide; hydrolyzing the silicon alkoxide; and forming a silica gel, may be integrated into a single continuous process with the help of synergetic parameters. In some embodiments, the as-obtained silica gel may be dried immediately. In some embodiments, the silica gel may be dried supercritically in order to generate a silica aerogel. In some embodiments, the silica gel may be dried subcritically in order to generate a silica aerogel. In some embodiments, the gel may be dried subcritically with the assistance of dielectric heating. In some embodiments, hydroxyl-containing organic molecules may result from hydrolysis of the alkoxide. In some embodiments, hydroxyl-containing organic molecules may result from formation of the silica gel. In some embodiments, hydroxyl-containing organic molecules may result from excess addition. In some embodiments, hydroxyl-containing organic molecules may result from the extraction of the pore liquid of the gel during drying. In some embodiments, hydroxyl-containing organic molecules may be recovered. In some embodiments, recovered hydroxyl-containing organic molecules may be used to make another (silicon) alkoxide. In some embodiments, the silica aerogel comprises one or more hydrophobic side groups. In some embodiments, the hydrophobic groups comprise at least an alkoxy group and/or at least a fatty acid group.

Silica aerogels may be produced from silica derived from various silica sources, comprising natural sources and/or an industrial sources. In some embodiments, the natural source may comprise rice, sugarcane bagasse, bamboo, horsetail (equisetum), oat straw, wheat straw, barley straw, sand, quartz, diatomite, volcanic ash, olivine, silicates, or zeolite. In some embodiments, the natural source may comprise rice, sugarcane bagasse, bamboo, horsetail (equisetum), oat straw, wheat straw, barley straw, sand, quartz, diatomite, volcanic ash, silicates, or zeolite. Other natural sources are possible. In some embodiments, the industrial source for silica may comprise silica sand, silica derived from fumed silica, silica derived from precipitated silica, silica derived from silica gel, silica derived from silica xerogel, silica derived from glass, silica derived from glass cullet, silica derived from fused silica, silica derived from glass fiber, silica derived from fly ash, silica derived from bottom ash, silica derived from slag, or silica derived from other waste streams. In some embodiments, the industrial source for silica may comprise silica sand, silica derived from fumed silica, silica derived from silica gel, silica derived from glass, silica derived from glass fiber, silica derived from fly ash, silica derived from bottom ash, silica derived from slag, or silica derived from other waste streams. Other silica sources are possible. In some embodiments, the silica source may receive one or more treatments before use. In some embodiments, the treatment of the silica source may comprise comminution, pulverization, cutting, grinding, chopping, milling, smashing, cleavage, dissolution, solvation, precipitation, boiling, heating, combustion, incineration, pyrolysis, calcination, pressurization, purification, extraction, superheated steaming, washing, rinsing, cleansing, leaching, acid treatment, base treatment, separation, filtration, sieving, dehydration, drying, blow drying, irradiation, sonication, or combinations thereof. Other treatments are possible and may be included in the treatment process. In some embodiments, one or more treatments may be performed on the silica source before the formation of the silicon alkoxide blend. In some embodiments, the preferred treatment or the combination of preferred treatments may depend on the silica source.

In some preferred embodiments, the natural source for silica may comprise rice waste, sugarcane bagasse, and/or bamboo leaves. In some embodiments, the silica source comprises silica derived from rice. In some embodiments, the silica source comprises silica derived from rice waste. In some embodiments, rice waste may comprise rice hull, rice husk, rice straw, rice joints, rice bran. In the present invention, the term "rice hull" may encompass "rice husk" as well. Rice waste is a biomass waste and may be available in high amounts. In some embodiments, the silica source comprises sugarcane bagasse. In some embodiments, sugarcane bagasse may be the fibrous residue obtained in sugar factories after crushing sugarcane and extracting the sugar-bearing juice from it. Similar to rice waste, sugarcane bagasse may be a biomass waste available in high amounts. In some embodiments, the silica source comprises bamboo. In some embodiments, silica may be derived from bamboo leaves. Other natural silica sources are possible.

In some embodiments, the natural source for silica may be combusted to ash. In some embodiments, the ash may be rich in silica. In some embodiments, the combustion of the natural source for silica may be calcined before obtaining ash. In some embodiments, the combustion of the natural source to obtain silica may generate energy. In some embodiments, the combustion of the natural source to obtain silica may generate electricity. In some embodiments, the combustion of the natural source may be performed at a temperature in the range of 200-1500° C. In some embodiments, the combustion of the natural source may be performed at a temperature in the range of 300-1000° C. In some preferred embodiments, the combustion of the natural source may be performed at a temperature in the range of 400-800° C. In some embodiments, extra air may be supplied during combustion in order to enhance combustion of organic material. In some embodiments, the combustion of the natural source may be performed for more 30 minutes or more. In some embodiments, the combustion of the natural source may be performed for more than 1 hour. In some embodiments, the combustion of the natural source may be performed for several hours, in the range of 1 to 8 hours. In some preferred embodiments, the combustion of the natural source may be performed for several hours, in the range of 2 to 6 hours. In some embodiments, the optimal combustion conditions may vary depending on the silica source as well as its region of origin and/or physical conditions comprising age, moist content, purity. In some embodiments, rice waste may be combusted to ash. In some embodiments, the rice hull may be combusted to ash, referred to as rice hull ash. In some embodiments, the rice husk may be combusted to ash, referred to as rice husk ash. In some embodiments, the rice straw may be combusted to ash, referred to as rice straw ash. In some embodiments, the rice joints may be combusted to ash, referred to as rice joint ash. In some embodiments, the rice bran may be combusted to ash, referred to as rice bran ash. In some embodiments, the sugarcane bagasse may be combusted to ash, referred to as sugarcane bagasse ash. In some embodiments, bamboo leaves may be combusted to ash, referred to as bamboo leaf ash.

In some embodiments, the silica source may be treated before calcination and/or combustion. In some embodiments, the silica source may comprise other substances. In some embodiments, the silica source may comprise non-silicon containing derivatives. In some embodiments, all non-silicon containing derivatives may be left in the silica source. In some embodiments, all non-silicon containing derivatives may be removed from the silica source. In some embodiments, some non-silicon containing derivatives may be left in the silica source. In some embodiments, the silica source may be treated to remove impurities in order to obtain a purer form of silica.

In some embodiments, the silica source may be treated to improve the extraction of silica. In some embodiments, the silica source may be treated to obtain a silica source with a higher specific surface area. In some embodiments, the silica source may be sieved, rinsed, cleansed, and/or filtered before use. In some embodiments, the silica source may be comminuted before use or further treatment. The comminution procedure may depend on the silica source and may comprise cutting, crushing, grinding, milling, and/or other operations or a combination thereof.

In some embodiments, the cleansed and/or comminuted silica source may be leached in an acidic solution. In some embodiments, the treatment of the silica source may comprise leaching in an organic or inorganic acid. In some embodiments, the acid comprises hydrogen chloride, hydrogen sulfate, nitric acid, hydrogen fluoride, hydrogen iodide, hydrogen bromide, hydrogen phosphate, acetic acid, oxalic acid, citric acid, and/or formic acid. Other acids are possible. In some preferred embodiments, the rice waste is leached in hydrogen chloride, sulfuric acid, citric acid, and/or oxalic acid.

In some embodiments, the cleansed and/or comminuted silica source may be leached in a basic solution. In some embodiments, the base may be selected from the group of an alkali metal compound, an alkaline earth metal compound, ammonia, ammonium hydroxide, a primary amine, a secondary amine, a tertiary amine, a quaternary amine compound. In some embodiments, the base may be an alkali metal compound or an alkaline earth metal compound or a combination of both. In some embodiments, the alkali metal compound may be an alkali metal hydroxide. In some embodiments, the alkali metal hydroxide may comprise lithium hydroxide (LiOH), sodium hydroxide (NaOH), potassium hydroxide (KOH), and/or cesium hydroxide (CsOH). In some embodiments, the alkali metal compound may be an alkali metal carbonate. In some embodiments, the alkali metal carbonate may comprise lithium carbonate ($Li_2CO_3$), sodium carbonate ($Na_2CO_3$), potassium carbonate ($K_2CO_3$), and/or cesium carbonate ($Cs_2CO_3$). In some embodiments, the alkaline earth metal may be an alkaline earth metal hydroxide. In some embodiments, the alkaline earth metal hydroxide may comprise beryllium hydroxide ($Be(OH)_2$), magnesium hydroxide ($Mg(OH)_2$), calcium hydroxide ($Ca(OH)_2$), strontium hydroxide ($Sr(OH)_2$), barium hydroxide ($Ba(OH)_2$), and/or radium hydroxide ($Ra(OH)_2$). In some embodiments, the base may be a primary amine. In some embodiments, the primary amine may comprise methylamine, ethylamine, propylamine, butylamine, pentylamine, hexylamine, octylamine, decylamine, 2-methylpropan-2-amine, 2-aminopentane, aniline, allylamine, tris(hydroxymethyl)aminomethane, 4,4'-oxydianiline, and/or 2,2'-dimethylbenzidine. Other primary amines may be possible. In some embodiments, the base may be a secondary amine. In some embodiments, a secondary amine may comprise dimethylamine, diethylamine, ethylmethylamine, N-methylpropylamine, N-methylbutylamine, diisopropylamine, dibutylamine, dihexylamine, dioctylamine, didecylamine, diphenylamine, diallylamine, pyrrolidine, and/or allylcyclohexylamine. Other secondary amines may be possible. In some embodiments, the base may be a tertiary amine. In some embodiments, a tertiary amine may comprise trimethylamine, triethylamine, tripropylamine, tributylamine, trihexylamine, trioctylamine, triisooctylamine, N,N-dimethylethylamine, N,N-diethylmethylamine, N,N-dimethylpropylamine, ethylenediaminetetraacetic acid, 3-dimethylamino-1-propanol, and/or triethanolamine. Other tertiary amines may be possible. In some embodiments, the base may be a quaternary amine compound. In some embodiments, a quaternary amine compound may comprise tetramethylammonium hydroxide, tetraethylammonium hydroxide, tetrapropylammonium hydroxide, tetraisopropylammonium hydroxide, tetrabutylammonium hydroxide, and/or didecyldimethylammonium hydroxide. Other quaternary amine compounds may be possible.

In some embodiments, the cleansed and/or comminuted silica source may be leached in a solution comprising an ammonium salt. In some embodiments, an ammonium salt may comprise ammonium bromide, ammonium carbonate, ammonium chloride, ammonium iodide, ammonium sulfate. In some embodiments, an ammonium salt may comprise a quaternary ammonium salt, comprising tetramethylammonium bromide, tetramethylammonium carbonate, tetramethylammonium chloride, tetramethylammonium iodide, tetramethylammonium sulfate, tetraethylammonium bromide, tetraethylammonium carbonate, tetraethylammonium chloride, tetraethylammonium iodide, tetraethylammonium sulfate, tetrapropylammonium bromide, tetrapropylammonium carbonate, tetrapropylammonium chloride, tetrapropylammonium iodide, tetrapropylammonium sulfate, tetraisopropylammonium bromide, tetraisopropylammonium carbonate, tetraisopropylammonium chloride, tetraisopropylammonium iodide, tetraisopropylammonium sulfate, didecyldimethylammonium bromide, didecyldimethylammonium carbonate, didecyldimethylammonium chloride, didecyldimethylammonium iodide, didecyldimethylammonium sulfate. Other ammonium salts and quaternary ammonium salts may be possible.

In some embodiments, the cleansed and/or comminuted silica source may be leached in a solution comprising a fluoride compound. In some embodiments, a fluoride compound may comprise lithium fluoride (LiF), sodium fluoride (NaF), potassium fluoride (KF), beryllium fluoride ($BeF_2$), magnesium fluoride ($MgF_2$), calcium fluoride ($CaF_2$), barium fluoride ($BaF_2$), aluminum fluoride ($AlF_3$), cadmium fluoride ($CdF_2$), ammonium fluoride ($NH_4F$), tetramethylammonium fluoride, tetraethylammonium fluoride, tetraisopropylammonium fluoride, tetrabutylammonium fluoride. Other fluoride compounds may be possible.

In some embodiments, the cleansed and/or comminuted silica source may be leached in different solutions such as discussed above, sequentially. In some preferred embodiments, the silica source may be treated with a base comprising sodium hydroxide (NaOH), potassium hydroxide (KOH), ammonia ($NH_3$), ammonium hydroxide ($NH_4OH$), potassium carbonate ($K_2CO_3$), and/or sodium carbonate ($Na_2CO_3$). In some other preferred embodiments, the silica source may be treated with a fluoride compound, comprising sodium fluoride and/or ammonium fluoride.

In some embodiments, the concentration of the acid or base in the leaching solution may be in the range of 1 to 10 wt %. In some embodiments, leaching may be performed for a few minutes. In some embodiments, leaching may be performed for a few hours. In some embodiments, leaching may be performed for more than 2 hours. In some embodiments, leaching may be performed for more than 4 hours. In some embodiments, leaching may be performed for less than 10 hours. In some embodiments, the acid or base leached silica source may be combusted to ash having a high silica concentration. In some embodiments, leaching of the natural source may be performed at an elevated temperature. In some embodiments, leaching of the natural source may be performed at a temperature higher than 30° C., higher than 50° C., higher than 70° C., higher than 90° C., higher than 100° C., higher than 120° C., higher than 150° C. In some embodiments, leaching of the natural source may be performed at an elevated temperature raised via dielectric heating. In some embodiments, dielectric heating may be referred to as heating by application of electromagnetic waves. In some preferred embodiments, the electromagnetic waves produced with dielectric heating are microwaves. In some embodiments, dielectric heating comprises heating via microwave radiation. In some embodiments, the microwave radiation may be generated by a magnetron. In some preferred embodiments, the frequency of the radiation may be between 0.5 GHz and 5 GHz. In some embodiments, the microwave power may be between about 200-700 W. In some preferred embodiments, the microwave power may be about 400-600 W.

In some embodiments, the ash obtained after combustion of the silica source may comprise at least 50 wt % silica. In some embodiments, the ash obtained after combustion of the silica source may comprise about 50-60 wt % silica. In some embodiments, the ash obtained after combustion of the silica source may comprise about 60-70 wt % silica. In some embodiments, the ash obtained after combustion of the silica source may comprise about 70-80 wt % silica. In some embodiments, the ash obtained after combustion of the silica source may comprise about 80-90 wt % silica. In some embodiments, the ash obtained after combustion of the silica source may comprise more than 90 wt % silica. In some embodiments, the ash obtained after combustion of the silica source may comprise more than 95 wt % silica. In some preferred embodiments, most (e.g., more than 50 wt %, or at least 60 wt %, at least 70 wt %, at least 80 wt %, or at least 90 wt %) of the silica is amorphous and not crystalline.

In some embodiments, the ash may comprise alkaline components. In some embodiments, the alkaline components may serve as catalysts for the production of alkoxides. In some embodiments, the alkaline components may serve as dehydrating agents for the production of alkoxides. In some embodiments, the alkaline components may comprise potassium oxide ($K_2O$), sodium oxide ($Na_2O$), calcium oxide (CaO), and/or magnesium oxide (MgO).

In some embodiments, the ash may be treated to obtain silica of higher purity. In some embodiments, the ash may be treated to obtain silica of higher surface area. In some embodiments, the ash may be treated using the same acid or base used to treat the silica source before combustion. In some embodiments, silica may be extracted from the ash with superheated steam.

In some embodiments, sonication may improve the extraction of silicon oxides from the silica containing feed. In some embodiments, the soundwaves produced during sonication may be generated by a sonicator. In some embodiments, the soundwaves produced during sonication may be generated by a sonic probe. In some embodiments, the soundwaves produced during sonication may be generated in a sonic bath. In some embodiments, the soundwaves may have a frequency of about 20 kHz. In some embodiments, the soundwaves may have a frequency of higher than 20 kHz, also referred to as ultrasonication. In some embodiments, ultrasonication may be preferred. In some embodiments, the ultrasonic frequencies may be applied using an ultrasonic probe or ultrasonic bath. In some embodiments, ultrasound may be applied for several seconds, several minutes, or several hours. In some embodiments, a pulse method may be applied comprising time intervals without ultrasound. In some embodiments, the ultrasonic power may be between 50 W and 1000 W. In some preferred embodiments, the ultrasonic power may be between 200 W and 700 W.

In some embodiments, the silica source comprises silica sand. In some embodiments, silica sand may encompass quartz sand, white sand, and/or industrial sand. In some embodiments, silica sand comprises at least 95 wt % silica. In some embodiments, sand grains and/or aggregates of sand may be broken down, such as with the help of a jaw crusher. In some embodiments, small particles may be dislodged from larger sand aggregates. In some embodiments, small particles may be dislodged from larger sand aggregates by ultrasonic treatment of a water suspension. In some embodiments, the ultrasonic frequencies may be applied using an ultrasonic probe or ultrasonic bath. In some embodiments, ultrasound may be applied for several seconds, several minutes, or several hours. In some embodiments, a pulse method may be applied comprising time intervals without ultrasound. In some embodiments, the ultrasonic power may be between 50 W and 1000 W. In some preferred embodiments, the ultrasonic power may be between 200 W and 700 W. In some embodiments, the silica sand may be converted into glass cullet in a furnace or rotary kiln at a temperature between 1100° C. and 1800° C. In some embodiments, the silica sand may be reacted with a strong base comprising preferably sodium hydroxide, potassium hydroxide, sodium carbonate, potassium carbonate, or a combination thereof, in a furnace or rotary kiln at a temperature between 1100° C. and 1600° C. In some embodiments, the silica sand may be converted to alkali metal silicates. In some embodiments, the silica sand may be converted into an aqueous alkali metal silicate solution. In some embodiments, the silica sand may be converted into an aqueous alkali metal silicate solution in the presence of a strong base comprising preferably sodium hydroxide or potassium hydroxide in a pressure vessel at a temperature between 200° C. and 300° C., at a pressure between 20 and 100 bar. In some embodiments, the silica source comprises precipitated silica. In some embodiments, precipitated silica may be obtained by precipitation of an alkali metal silicate solution. In some embodiments, the silica source comprises silica gel. In some embodiments, the silica gel may be obtained by reacting alkali metal silicates with an aqueous solution containing an acid or base. In some embodiments, the silica source comprises silica xerogel. In some embodiments, silica xerogel may be obtained after drying a silica gel.

In some embodiments, the silica source comprises glass. In some embodiments, the glass may be obtained from glass waste. In some embodiments, the glass waste comprises glass from bottles, flasks, containers, and/or glazing for windows. Other sources of glass waste are possible. In some embodiments, the glass and glass waste may be colored. In some embodiments, the glass may be clear, green, or brown. In some embodiments, the glass waste may consist of a mixture of glasses of different colors from different sources. In some preferred embodiments, the glass waste comprises clear glass. In some embodiments, the silica source comprises glass cullet. In some embodiments, glass cullet may be obtained from sand. In some embodiments, glass cullet may be obtained from glass waste. In some embodiments, glass cullet may be obtained from both sand and glass waste. In some embodiments, the silica source comprises fused silica. In some embodiments, the silica source comprises silica derived from glass fiber. In some embodiments, glass fiber may be derived from mats, grids, and/or blankets. In some embodiments, glass fiber may be derived from glass wool. In some embodiments, glass fiber may be derived from chopped glass fibers. In some embodiments, glass fiber may be derived from fiber reinforced polymer composites. In some embodiments, glass fiber may be derived from fiberglass. In some embodiments, glass, glass waste, glass cullet, fused silica, and/or glass fibers may be treated before being used as a silica source. In some embodiments, the glass may be pulverized to the desired particle size fraction. In some embodiments, the glass may be cleansed before and/or after being pulverized to the desired particle size fraction.

In some embodiments, the glass may be washed with acidic water. In some embodiments, the pulverized glass particles may be smaller than 100 μm. In some embodiments, the pulverized glass particles may be smaller than 50 μm. In some embodiments, the pulverized glass particles may be calcined. In some embodiments, the pulverized glass particles may be dissolved in an alkaline solution with a pH higher than 10. In some embodiments, the pulverized glass particles may be dissolved in an alkaline solution comprising or consisting of a strong base. In some embodiments, the pulverized glass particles may be reacted with a strong base comprising preferably sodium hydroxide or potassium hydroxide. In some embodiments, the pulverized glass particles may be calcined at a temperature between 500-1500° C. In some preferred embodiments, the pulverized glass particles may be calcined at a temperature lower than 1000° C.

In some embodiments, the silica source comprises silica derived from industrial waste. In some embodiments, the industrial waste comprises fly ash, bottom ash, slag, and/or industrial sludge. In some embodiments, fly ash may comprise waste material driven out of coal-fired boilers in coal-fired power plants. In some embodiments, bottom ash may comprise waste material driven out at the bottom of coal-fired boilers in coal-fired power plants. In some embodiments, the combination of fly ash and bottom ash may be referred to as coal ash. In some embodiments, fly ash may consist of about 10-20 wt % silica, or about 20-40 wt % silica, or about 40-60 wt % silica. Other industrial waste sources are possible.

In some embodiments, a higher specific surface area of the silica source may result in a higher reactivity. In some embodiments, a higher specific surface area of the silica source may result in a higher yield of the formation of silicon alkoxides. In some embodiments, the specific surface area may be lower than 20 $m^2\ g^{-1}$. In some embodiments, the specific surface area may be lower than 10 $m^2\ g^{-1}$. In some embodiments, the specific surface area may be higher than 20 $m^2\ g^{-1}$. In some embodiments, the specific surface area may be higher than 40 $m^2\ g^{-1}$. In some embodiments, the specific surface area may be higher than 100 $m^2\ g^{-1}$. In some embodiments, the specific surface area may be higher than 200 $m^2\ g^{-1}$. In some embodiments, the specific surface area may be higher than 300 $m^2\ g^{-1}$. In some embodiments, the specific surface area may be higher than 400 $m^2\ g^{-1}$. In some preferred embodiments, the specific surface area may be higher than 500 $m^2\ g^{-1}$. In some other preferred embodiments, the specific surface area may be higher than 600 $m^2\ g^{-1}$. Yet in some other preferred embodiments, the specific surface area may be higher than 700 $m^2\ g^{-1}$. In some embodiments, the specific surface area of the silica source may have changed after treatment. In some embodiments, the specific surface area of the silica source may have changed after reaction.

In some embodiments, one or more hydroxyl-containing organic molecules may react with metal oxides to form an alkoxide. In some embodiments, one or more hydroxyl-containing organic molecules may react with metalloid oxides to form an alkoxide. In some embodiments, one or more hydroxyl-containing organic molecules may react with silicon oxides to form a silicon alkoxide. In some embodiments, the produced alkoxide may be monomeric or oligomeric (dimeric, trimeric, tetrameric, pentameric, hexameric, heptameric, octameric, nonameric, decameric). In some embodiments, the oligomeric alkoxide may contain more than ten (decameric) repeating units.

Alkoxides produced in the method according to the invention are compounds that may be represented by the general formula $M(OR^a)_n$, in which M is an element as defined herein, $OR^a$ or $—OR^a$ is an alkoxy group, and n is an integer less than or equal to the valence of element M. In some embodiments, tetravalent (n=4) alkoxides may be formed such as silicon alkoxides. In some embodiments, pentavalent (n=5) alkoxides may be formed. In some embodiments, hexavalent (n=6) alkoxides may be formed. In some embodiments, alkoxides may be formed comprising two M-elements. In some embodiments, alkoxides may be formed comprising three M-elements. In some embodiments, alkoxides may be formed comprising more than three M-elements. In some preferred embodiments, the alkoxides contain no more than three M-elements. In some embodiments, an alkoxide blend may be obtained comprising alkoxides having the same M-element, but with a different valence. In some embodiments, an alkoxide blend may be obtained comprising alkoxides having different M-elements.

In some preferred embodiments, the element M may be selected form the group comprising, silicon, aluminum, titanium, zirconium, iron, boron, vanadium, tin, germanium, tungsten, chromium, holmium, erbium, niobium, tantalum, hafnium, gallium, copper, nickel, cobalt, indium, magnesium, calcium, manganese, and molybdenum. Other elements are possible. In some more preferred embodiments, the element M may be selected from the group comprising, silicon, aluminum, and zirconium. Yet, in some more preferred embodiments, the element M is silicon (Si).

In some embodiments, silicon oxides from a silica containing feed may be reacted with one or more hydroxyl-containing organic molecules as defined herein to form a silicon alkoxide. In some embodiments, the silicon alkoxide may be a tetraalkyl orthosilicate represented by the following general chemical formula (I):

Formula (I)

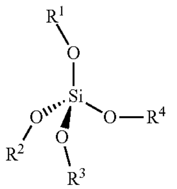

In some embodiments, (silicon) alkoxides may be formed comprising two silicon elements, being hexaalkyl diorthosilicates, represented by the chemical formula (II):

Formula (II)

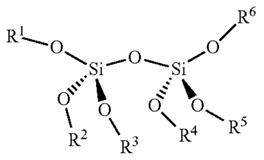

In some embodiments, (silicon) alkoxides may be formed comprising three silicon elements, being octaalkyl triorthosilicate, represented by the chemical formula (III):

Formula (III)

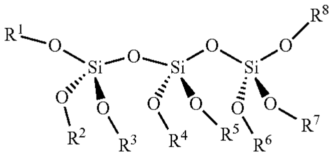

In some embodiments, $R^1$, $R^2$, $R^3$, $R^4$, $R^5$, $R^6$, $R^7$, and $R^8$ originate (derive) from the hydroxyl-containing organic molecules as defined herein. In some embodiments, $R^1$, $R^2$, $R^3$, $R^4$, $R^5$, $R^6$, $R^7$, and $R^8$ may represent hydrocarbon groups. In some embodiments, the hydrocarbon groups may originate (derive) from the hydroxyl-containing organic molecules as defined herein. In some embodiments, $R^1$, $R^2$, $R^3$, $R^4$, $R^5$, $R^6$, $R^7$, and $R^8$ may represent different groups and/or bonds. In some preferred embodiments, $R^1$, $R^2$, $R^3$, $R^4$, $R^5$, $R^6$, $R^7$, and $R^8$ may represent hydrocarbon groups originating from the hydroxyl-containing organic molecules as defined herein. In some embodiments, only one R-group (hydrocarbon group) may be selected for the silicon (or other element M) alkoxides, such that $R^1$, $R^2$, $R^3$, $R^4$, $R^5$, $R^6$, $R^7$, and $R^8$ are all the same group. In some embodiments, two different R-groups may be selected for the alkoxides. In some embodiments, three different R-groups may be selected for the alkoxides. In some embodiments, four different R-groups may be selected for the alkoxides. In some embodiments, five different R-groups may be selected for the alkoxides. In some embodiments, six different R-groups may be selected for the alkoxides. In some embodiments, seven different R-groups may be selected for the alkoxides. In some embodiments, all selected R-groups may be selected for the alkoxides, such that $R^1$, $R^2$, $R^3$, $R^4$, $R^5$, $R^6$, $R^7$, and $R^8$ are all different from each other.

In some embodiments, the (silicon) alkoxide may contain a number of silicon atoms ranging from 1 to 10. In some embodiments, the alkoxide may contain a number of silicon atoms ranging from 1 to 7. In some embodiments, the alkoxide may contain a number of silicon atoms ranging from 1 to 5. In some preferred embodiments, the alkoxide may contain a number of silicon atoms ranging from 1 to 3. In some embodiments, at least 70 mol % of the formed alkoxides may contain a number of silicon atoms ranging from 1 to 3. In some embodiments, at least 80 mol % of the formed alkoxides may contain a number of silicon atoms ranging from 1 to 3. In some embodiments, at least 90 mol % of the formed alkoxides may contain a number of silicon atoms ranging from 1 to 3. In some preferred embodiments, at least 95 mol % of the formed alkoxides may contain a number of silicon atoms ranging from 1 to 3.

In some embodiments, the hydroxyl-containing organic molecule comprises an alcohol. Alcohols may encompass organic compounds in which a hydroxyl group (—OH) is attached to a saturated carbon atom.

In some embodiments, the alcohol is an alkyl alcohol preferably having the formula $R^b$—OH wherein $R^b$ is alkyl as defined herein. In some embodiments, the alkylchain (i.e., $R^b$) of the alcohol may have 1 to 18 carbon atoms, such as for example 1 to 5 carbon atoms. In some embodiments, the alcohol comprises methanol, ethanol, isopropanol, n-propanol, tert-butanol, sec-butanol, n-butanol, n-pentanol, n-hexanol, and/or an amyl alcohol (primary, secondary, and/or tertiary). Other alcohols are possible. In some preferred embodiments, the hydroxyl-containing organic molecule may be methanol, ethanol, isopropanol, or tert-butanol. In some embodiments, a combination of different alcohols may be used.

The term "alkyl" or "$C_{1-30}$alkyl" as a group or part of a group as used herein means $C_1$-$C_{30}$ normal, secondary, or tertiary, linear, branched or straight hydrocarbon with no site of unsaturation. Examples are methyl, ethyl, 1-propyl (n-propyl), 2-propyl (iPr), 1-butyl, 2-methyl-1-propyl(i-Bu), 2-butyl (s-Bu), 2-dimethyl-2-propyl (t-Bu), 1-pentyl (n-pentyl), 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-icosyl. In particular embodiments, the term alkyl refers to $C_{1-18}$alkyl ($C_{1-18}$ hydrocarbons), for instance $C_{1-12}$ alkyl ($C_{1-12}$ hydrocarbons), or for instance $C_{1-9}$ alkyl ($C_{1-9}$ hydrocarbons), or for instance $C_{1-6}$alkyl ($C_{1-6}$ hydrocarbons).

In some embodiments, the alcohol may be an alkenyl alcohol preferably having the formula $R^c$—OH wherein $R^c$ is alkenyl as defined herein.

The term "alkenyl" or "$C_{2-30}$ alkenyl" as used herein is $C_2$-$C_{30}$ normal, secondary or tertiary, linear, branched or straight hydrocarbon with at least one site (usually 1 to 3, preferably 1) of unsaturation, namely a carbon-carbon, sp2 double bond. Examples include, but are not limited to: ethylene or vinyl (—CH═$CH_2$), allyl (—$CH_2$CH═$CH_2$), and 5-hexenyl (—$CH_2CH_2CH_2CH_2$CH═$CH_2$). The double bond may be in the cis or trans configuration. In particular embodiments, the term alkenyl refers to $C_{2-22}$ alkenyl ($C_{2-22}$hydrocarbons), or to $C_{8-26}$ alkenyl ($C_{8-26}$ hydrocarbons), or to $C_{2-18}$ alkenyl ($C_{2-18}$ hydrocarbons), and for instance to $C_{2-6}$ alkenyl ($C_{2-6}$ hydrocarbons) as further defined herein above with at least one site (usually 1 to 3, preferably 1) of unsaturation, namely a carbon-carbon, sp2 double bond. In some preferred embodiments, the unsaturated alcohol may be selected from the group comprising ethanol (vinyl alcohol), 1-propen-2-ol (prop-1-en-2-ol), 2-propen-1-ol (prop-2-en-1-ol, allyl alcohol), 3-buten-1-ol (allyl carbinol), 3-buten-2-ol (methyl vinyl carbinol), 4-penten-1-ol, 3-methyl-3-buten-1-ol (isoprenol), 5-hexen-1-ol. Other unsaturated alcohols may be possible. In yet further preferred embodiments, ethanol (vinyl alcohol) and/or 3-buten-1-ol (allyl carbinol) may be used.

In some embodiments, the hydroxyl-containing organic molecule comprises a fatty acid. In some embodiments, a fatty acid may be a carboxylic acid with a saturated or unsaturated aliphatic chain. In some embodiments, the chain of the fatty acid may have 8 to 26 carbons, although fatty acids with chains of fewer or more carbons exist as well. In some embodiments, the fatty acid may be obtained from triglycerides from a natural source such as fats and oils found in plants. In some embodiments, the saturated fatty acid comprises caprylic acid, capric acid, lauric acid, myristic acid, palmitic acid, stearic acid, arachidic acid, behenic acid, lignoceric acid, and/or cerotic acid. Other saturated fatty acids are possible. In some preferred embodiments, the saturated fatty acid may be palmitic and/or stearic acid. In some embodiments, the unsaturated fatty acid comprises myristoleic acid, palmitoleic acid, sapienic acid, oleic acid, elaidic acid, vaccenic acid, linoleic acid, arachidonic acid, and/or erucic acid. Other unsaturated fatty acids are possible. In some preferred embodiments, the unsaturated fatty acid may be oleic and/or linoleic acid.

In some embodiments, the hydroxyl-containing organic molecule comprises a fatty alcohol. In some embodiments, the fatty alcohol is an alcohol with a saturated or unsaturated aliphatic chain. In some embodiments, the fatty alcohol is an alcohol having the formula $R^d$—OH wherein $R^d$ is alkyl or an alkenyl as defined herein above. In some embodiments, the fatty alcohol may be an aliphatic alcohol typically consisting of a chain of 8 to 26 carbons, although fatty alcohols with chains of fewer or more carbons exist as well. In some embodiments, the fatty alcohol may be obtained from a natural source such as fats and oils found in plants. In some embodiments, a fatty alcohol may be obtained from a fatty ester. In some embodiments, a fatty alcohol may be obtained by reacting a fatty ester with hydrogen gas ($H_2$) at elevated temperature and pressure. In some embodiments, a fatty alcohol may be obtained by reacting a fatty ester with hydrogen gas ($H_2$) at supercritical conditions. In some embodiments, the fatty alcohol comprises capryl alcohol (1-octanol), pelargonic alcohol (1-nonanol), capric alcohol (1-decanol), hendecanol (1-undecanol), lauryl alcohol (1-dodecanol), myristyl alcohol (1-tetradecanol), cetyl alcohol (1-hexadecanol), palmitoleyl alcohol (cis-9-hexadecen-1-ol), stearyl alcohol (1-octadecanol), oleyl alcohol (1-octadecenol), arachidyl alcohol (1-eicosanol), behenyl alcohol (1-docosanol), erucyl alcohol (cis-13-docosen-1-ol), and/or ceryl alcohol (1-hexacosanol). In some preferred embodiments, the fatty alcohol may be lauryl, stearyl, or oleyl alcohol.

In some embodiments, the silica source may, in addition to being reacted with the one or more hydroxyl-containing organic molecules to form silicon alkoxides, also be reacted with an organic polymer. The reaction of the silica source with the organic polymer may be simultaneous with or sequential to (in any order) the reaction of the silica source with the one or more hydroxyl-containing organic molecules. Hence, in some preferred embodiments, the organic polymer may bond to one or more silicon oxides during formation of the silicon alkoxide blend. The organic polymer may comprise at least two and typically a plurality of functional groups capable of forming a covalent adduct with silicon oxide. The organic polymer may thus be able to mechanically reinforce the silica network by crosslinking silanol groups, such as in particular non-adjacent silanol groups. In some embodiments, the organic polymer may partially hydrophobize the silica network by eliminating free silanol groups. In some embodiments, the organic polymer may comprise a polymer derived from an isocyanate, an epoxide, an amine, a carboxylic acid, or an alcohol. In some preferred embodiments, the organic polymer may comprise a polyol, a polyacrylate, and/or a polyvinyl. In some preferred embodiments, the polymer may comprise a polyol. In some other preferred embodiments, the polymer may comprise polyvinyl alcohol and/or polyvinyl acetate. In some embodiments, the organic polymer may be biobased. In some preferred embodiments, the organic polymer may be derived from biowaste. In some preferred embodiments, the polymer may comprise lignin.

In some embodiments, the reaction of hydroxyl-containing organic molecules, and preferably at least two different hydroxyl-containing organic molecules, with silicon oxides, such as those described herein, may result in the formation of a silicon alkoxide blend. In some embodiments, the silicon alkoxide blend may comprise more than one type of silicon alkoxides. In some preferred embodiments, the silica source may be reacted with a mixture comprising i) methanol and/or ethanol and ii) one or more $C_3$-$C_5$ alcohols, such as one or more $C_3$-$C_5$ alcohols selected from the group comprising isopropanol, n-propanol, tert-butanol, sec-butanol, n-butanol, amyl alcohol, iii) optionally a fatty acid and/or fatty alcohol, preferably as defined herein, and iv) optionally an organic polymer, preferably as defined herein, preferably a polyol.

In some embodiments, the molar ratio of i) methanol and/or ethanol to ii) one or more $C_3$-$C_5$ alcohols in the mixture is between 1:1 and 4:1, preferably between 2:1 and 3:1.

In some embodiments, the silicon alkoxide comprises at least two different groups such as two different alkoxy groups. In some embodiments, an alkoxy group may be provided by an alcohol and may comprise a methoxy, ethoxy, isopropoxy, n-propoxy, tert-butoxy, sec-butoxy, n-butoxy, n-pentoxy, n-hexoxy, and/or by an alkoxy group of a fatty acid/ester, and/or by an alkoxy group of a fatty alcohol.

In some embodiments, at least one alkoxy group may be of a fatty acid/ester or fatty alcohol used as hydroxyl-containing organic molecule within the present invention. Other alkoxy groups are possible. In some preferred embodiments, the silicon alkoxide comprises i) a methoxy group and/or an ethoxy group and ii) one or more $C_3$-$C_5$ alkoxy groups, such as one or more $C_3$-$C_5$ alkoxy groups selected from the group comprising isopropoxy group, n-propoxy group, tert-butoxy group, sec-butoxy group, n-butoxy group, and amyloxy group, and iii) optionally a fatty acid ester group and/or a fatty alkoxy group.

In some preferred embodiments, the silicon alkoxide comprises a methoxy group.

In some preferred embodiments, the silicon alkoxide comprises an isopropoxy group.

In some particularly preferred embodiments, the silicon alkoxide comprises a tert-butoxy group.

In some preferred embodiments, the silicon alkoxide comprises a methoxy group and an isopropoxy group.

In some particularly preferred embodiments, the silicon alkoxide comprises a methoxy group and a tert-butoxy group.

In some embodiments, methoxy groups may be preferred for the preparation of the silicon alkoxides.

In some embodiments, silicon alkoxides comprising 2 or more different alkoxy groups may be present in the silicon alkoxide blend. In some embodiments, the silicon alkoxide blend may comprise greater than 10 mol % of a silicon alkoxide with 2 or more different alkoxy groups. In some embodiments, the silicon alkoxide blend may comprise greater than 20 mol % of a silicon alkoxide with 2 or more different alkoxy groups. In some embodiments, the silicon alkoxide blend may comprise greater than 30 mol % of a silicon alkoxide with 2 or more different alkoxy groups. In some embodiments, the silicon alkoxide blend may comprise greater than 40 mol % of a silicon alkoxide with 2 or more different alkoxy groups. In some embodiments, the silicon alkoxide blend may comprise greater than 50 mol % of a silicon alkoxide with 2 or more different alkoxy groups. In some embodiments, the silicon alkoxide blend may comprise greater than 60 mol % of a silicon alkoxide with 2 or more different alkoxy groups. In some embodiments, the silicon alkoxide blend may comprise greater than 70 mol % of a silicon alkoxide with 2 or more different alkoxy groups. In some embodiments, the silicon alkoxide blend may comprise greater than 80 mol % of a silicon alkoxide with 2 or more different alkoxy groups. In some embodiments, the silicon alkoxide blend may comprise greater than 90 mol % of a silicon alkoxide with 2 or more different alkoxy groups. In some embodiments, the silicon alkoxide blend may comprise greater than 95 mol % of a silicon alkoxide with 2 or more different alkoxy groups. In some embodiments, the silicon alkoxide blend may comprise greater than 98 mol % of a silicon alkoxide with 2 or more different alkoxy groups. In some embodiments, the silicon alkoxide blend may comprise greater than 99 mol % of a silicon alkoxide with 2 or more different alkoxy groups. In some embodiments, the silicon alkoxide blend may comprise about 100 mol % of a silicon alkoxide with 2 or more different alkoxy groups. In some embodiments, the silicon alkoxide blend may comprise 100 mol % of a silicon alkoxide with 2 or more different alkoxy groups.

In some embodiments, individual alkoxides may be isolated from the blend via separation techniques comprising distillation. In some embodiments, nuclear magnetic resonance (NMR) may be used to identify different alkoxides in the blend. In some embodiments, the different silicon alkoxides and the alkoxy groups on silicon alkoxides may be identified and quantified via the chemical shifts in $^{1}H$ NMR spectra, $^{13}C$ NMR spectra, $^{29}Si$ NMR spectra, and quantitative NMR data of the aerogel specimen. One of ordinary skill in the art would know how to obtain and analyze $^1H$ NMR spectra, $^{13}C$ NMR spectra, $^{29}Si$ NMR spectra, and quantitative NMR data.

In some embodiments, Fourier-transform infrared spectroscopy (FTIR) may be used to identify different alkoxides in the blend. One of ordinary skill in the art would know how to obtain and analyze FTIR spectra.

In some embodiments, gas chromatography-mass spectrometry (GC-MS) may be used to identify different alkoxides in the blend. One of ordinary skill in the art would know how to obtain and analyze GC-MS spectra.

In some embodiments, one or more hydroxyl-containing organic molecules may react with a silicon oxide from a silica containing feed to form a silicon alkoxide, which may proceed if the co-product water is removed from the system immediately and continuously. In some embodiments, water may be removed from the system with the help of a desiccant, dehydrating agent, water scavenger, proton scavenger, or a combination thereof. In some embodiments, water may be removed with the help of a desiccant. In some embodiments, the term “desiccant” may encompass “dehydrating agent” as well. In some embodiments, the dehydrating agent may be organic or inorganic. In some embodiments, molecular sieves may be used as dehydrating agent. In some embodiments, zeolites may be used as molecular sieve. In some preferred embodiments, molecular sieves with a pore diameter in the range of 1-5 Å may be used. Yet in some more preferred embodiments, molecular sieves with a pore diameter of 3 Å may be used. In some embodiments, the inorganic dehydrating agent comprises aluminum oxide ($Al_2O_3$), calcium oxide (CaO), sodium oxide ($Na_2O$), potassium oxide ($K_2O$), magnesium oxide (MgO), calcium chloride ($CaCl_2$)), calcium sulfate ($CaSO_4$), sodium sulfate ($Na_2SO_4$), and potassium carbonate ($K_2CO_3$). Other desiccants may be possible. In some preferred embodiments, dehydrating agent calcium oxide (CaO), sodium oxide ($Na_2O$), and/or potassium oxide ($K_2O$) may be added. In some embodiments, the molar ratio of inorganic dehydrating agent:silica may be about 1:1. In some embodiments, the molar ratio of inorganic dehydrating agent:silica may be about 2:1. In some embodiments, the molar ratio of inorganic dehydrating agent:silica may be about 3:1. In some embodiments, the molar ratio of inorganic dehydrating agent:silica may be about 4:1. In some embodiments, the molar ratio of inorganic dehydrating agent:silica may be about 5:1. In some preferred embodiments, the molar ratio of inorganic dehydrating agent:silica may be larger than about 0.1:1. In some preferred embodiments, the molar ratio of inorganic dehydrating agent:silica may be smaller than about 7:1. In some preferred embodiments, the molar ratio of inorganic dehydrating agent:silica may be about 3:1. In some embodiments, the dehydration of the system with the help of calcium oxide (CaO), sodium oxide ($Na_2O$), potassium oxide ($K_2O$) may result in the formation of calcium hydroxide ($Ca(OH)_2$), sodium hydroxide (NaOH), potassium hydroxide (KOH), respectively. In some embodiments, the consumed (i.e. hydrated) dehydrating agent may be recovered via heating. In some embodiments, the regenerated dehydrating agent may be reused. In some preferred embodiments, calcium oxide may be used, which when hydrated may be converted into calcium hydroxide. In some embodiments, calcium hydroxide may be used as a base catalyst for the formation of alkoxides as well as for the sol-gel step to produce silica gels. In some other preferred embodiments, sodium oxide may be used, which when hydrated may be converted into sodium hydroxide. In some embodiments, sodium hydroxide may be used as a base catalyst for the formation of alkoxides as well as for the sol-gel step to produce silica gels. In some other preferred embodiments, potassium oxide may be used, which when hydrated may be converted into potassium hydroxide. In some embodiments, potassium hydroxide may be used as a base catalyst for the formation of alkoxides as well as for the sol-gel step to produce silica gels.

In some embodiments, water may be removed with the help of a water scavenger. In some embodiments, the water scavenger comprises an organic acid anhydride. In some embodiments, the organic acid anhydride may comprise acetic anhydride, maleic anhydride, succinic anhydride, propionic anhydride, butyric anhydride, isobutanoic anhydride, valeric anhydride, hexanoic anhydride, decanoic anhydride, dodecanoic anhydride, myristic anhydride, palmitic anhydride, stearic anhydride, oleic anhydride, and/or cyclohexanecarboxylic anhydride. Other anhydrides may be possible. In some preferred embodiments, the organic acid anhydride acetic anhydride may be used as a water scavenger. In some embodiments, the water scavenger comprises a ketal. In some embodiments, the water scavenger comprises an acetal. In some embodiments, acetals may encompass ketals. In some embodiments, the acetal comprises acetone dimethyl acetal (2,2-dimethoxypropane), acetone diethyl acetal (2,2-diethoxypropane), and/or propionaldehyde diethyl acetal (1,1-diethoxypropane). In some embodiments, the water scavenger comprises a nitrile. In some embodiments, the nitrile comprises acetonitrile, benzonitrile, 2-cyanopyridine, and/or 2-furonitrile. In some embodiments, the water scavenger comprises an ester. In some embodiments, the ester comprises methyl formate, methyl acetate, trimethyl orthoformate (trimethoxymethane), trimethoxyethane, and/or methyl trichloroacetate. In some preferred embodiments, the water scavenger may comprise acetone dimethyl acetal (2,2-dimethoxypropane) and/or trimethyl orthoformate (trimethoxymethane). In some preferred embodiments, acetone dimethyl acetal (2,2-dimethoxypropane) may be used as a water scavenger.

In some embodiments, one or more hydroxyl-containing organic molecules may react with a silicon oxide from a silica containing feed to form a silicon alkoxide, which may proceed if the hydrogen ion ($H^+$) gets removed which otherwise would react with hydroxide ($OH^-$) to form the co-product water, which may shift the chemical equilibrium of the reaction to the left. In some embodiments, a proton scavenger may be used. In some embodiments, a proton scavenger may be a molecule capable of binding to a hydrogen ion (proton, $H^+$). In some embodiments, an epoxide may be used as a proton scavenger. In some embodiments, the epoxide may comprise ethylene oxide, propylene oxide, 1,2-epoxybutane, 2,3-epoxybutane, epichlorohydrin, phenyl ethylene oxide (styrene oxide), vinyl cyclohexene dioxide, 2,3-epoxypropanol, dim ethyl oxirane, trim ethylene oxide, dimethyloxetane. Other epoxides may be possible. In some embodiments, a combination of epoxides may be used. In some preferred embodiments, propylene oxide may be used. In some embodiments, ammonia ($NH_3$) may be used as a proton scavenger. In some embodiments, as a result of the removal of hydrogen ions ($H^+$) and the formation of hydroxide ($OH^-$), the addition of water may result in a base catalyzed hydrolysis, which may result in the formation of a sol.

In some embodiments, one or more hydroxyl-containing organic molecules may react with a silicon oxide from a silica containing feed to form a silicon alkoxide, which may be performed in the presence of a catalyst, such as a catalyst comprising or selected from a base, an ammonium salt, a fluoride compound, and mixtures thereof. In some embodiments, the base may be selected from the group of an alkali metal compound, an alkaline earth metal compound, ammonia, ammonium hydroxide, a primary amine, a secondary amine, a tertiary amine, a quaternary amine compound, an ammonium salt. In some embodiments, the base may be an alkali metal compound or an alkaline earth metal compound or a combination of both. In some embodiments, the alkali metal compound may be an alkali metal hydroxide. In some preferred embodiments, the alkali metal hydroxide may comprise lithium hydroxide (LiOH), sodium hydroxide (NaOH), potassium hydroxide (KOH), and/or cesium hydroxide (CsOH). In some embodiments, the alkali metal compound may be an alkali metal carbonate. In some preferred embodiments, the alkali metal carbonate comprises lithium carbonate ($Li_2CO_3$), sodium carbonate ($Na_2CO_3$), potassium carbonate ($K_2CO_3$), and/or cesium carbonate ($Cs_2CO_3$). In some embodiments, the alkaline earth metal may be an alkaline earth metal hydroxide. In some embodiments, the alkaline earth metal hydroxide may comprise beryllium hydroxide ($Be(OH)_2$), magnesium hydroxide ($Mg(OH)_2$), calcium hydroxide ($Ca(OH)_2$), strontium hydroxide ($Sr(OH)_2$), barium hydroxide ($Ba(OH)_2$), and/or radium hydroxide ($Ra(OH)_2$) In some embodiments, one or more bases may be used for the formation of the alkoxide. In some preferred embodiments, the formation of the alkoxide may be performed in the presence of sodium hydroxide or potassium hydroxide. In some embodiments, the base may be a primary amine. In some embodiments, the primary amine may comprise methylamine, ethylamine, propylamine, butylamine, pentylamine, hexylamine, octylamine, decylamine, 2-methylpropan-2-amine, 2-aminopentane, aniline, allylamine, tris(hydroxymethyl)aminomethane, 4,4'-oxydianiline, and/or 2,2'-dimethylbenzidine. Other primary amines may be possible. In some embodiments, the base may be a secondary amine. In some embodiments, a secondary amine may comprise dimethylamine, diethylamine, ethylmethylamine, N-methylpropylamine, N-methylbutylamine, diisopropylamine, dibutylamine, dihexylamine, dioctylamine, didecylamine, diphenylamine, diallylamine, pyrrolidine, and/or allylcyclohexylamine. Other secondary amines may be possible. In some embodiments, the base may be a tertiary amine. In some embodiments, a tertiary amine may comprise trimethylamine, triethylamine, tripropylamine, tributylamine, trihexylamine, trioctylamine, triisooctylamine, N,N-di methyl ethyl amine, N,N-diethylmethylamine, N,N-dim ethyl propyl amine, ethylenediaminetetraacetic acid, 3-dimethylamino-1-propanol, triethanolamine. Other tertiary amines may be possible. In some embodiments, the base may be a quaternary amine compound. In some embodiments, a quaternary amine compound may comprise tetramethylammonium hydroxide, tetraethylammonium hydroxide, tetrapropylammonium hydroxide, tetraisopropylammonium hydroxide, tetrabutylammonium hydroxide, and/or didecyldimethylammonium hydroxide. Other quaternary amine compounds may be possible. In some embodiments, an ammonium salt may be used as a catalyst for the formation of the alkoxide. In some embodiments, an ammonium salt may comprise ammonium bromide, ammonium carbonate, ammonium chloride, ammonium iodide, ammonium sulfate. In some embodiments, an ammonium salt may comprise a quaternary ammonium salt, comprising tetramethylammonium bromide, tetramethylammonium carbonate, tetramethylammonium chloride, tetramethylammonium iodide, tetramethylammonium sulfate, tetraethylammonium bromide, tetraethylammonium carbonate, tetraethylammonium chloride, tetraethylammonium iodide, tetraethylammonium sulfate, tetrapropylammonium bromide, tetrapropylammonium carbonate, tetrapropylammonium chloride, tetrapropylammonium iodide, tetrapropylammonium sulfate, tetraisopropylammonium bromide, tetraisopropylammonium carbonate, tetraisopropylammonium chloride, tetraisopropylammonium iodide, tetraisopropylammonium sulfate, didecyldimethylammonium bromide, didecyldimethylammonium carbonate, didecyldimethylammonium chloride, didecyldimethylammonium iodide, didecyldimethylammonium sulfate. Other ammonium salts and quaternary ammonium salts may be possible. In some preferred embodiments, diethylamine or triethylamine may be used as amine base.

In some embodiments, a fluoride compound may be used as a catalyst for the formation of the alkoxide. In some embodiments, the cleansed and/or comminuted silica source may be leached in a solution comprising a fluoride compound. In some embodiments, a fluoride compound may comprise lithium fluoride (LiF), sodium fluoride (NaF), potassium fluoride (KF), beryllium fluoride ($BeF_2$), magnesium fluoride ($MgF_2$), calcium fluoride ($CaF_2$), barium fluoride ($BaF_2$), aluminum fluoride ($AlF_3$), cadmium fluoride ($CdF_2$), ammonium fluoride ($NH_4F$), tetramethylammonium fluoride, tetraethylammonium fluoride, tetraisopropylammonium fluoride, tetrabutylammonium fluoride. Other fluoride compounds may be possible. In some preferred embodiments, sodium fluoride, ammonium fluoride, and/or tetrabutylammonium fluoride may be used.

In some embodiments, the molar ratio catalyst:silica may equal about 0.005:1, 0.05:1, 0.1:1, 0.5:1, 1:1, 5:1, 10:1, 15:1. In some preferred embodiments, the molar ratio catalyst: silica may be larger than 0.001:1. In some preferred embodiments, the molar ratio catalyst:silica may be smaller than 20:1.

In some embodiments, the reaction of hydroxyl-containing organic molecules with silicon oxides to produce silicon alkoxides may proceed in the presence of carbon dioxide. In some embodiments, carbon dioxide may accelerate the reaction of the hydroxyl-containing organic molecules with silicon oxides. In some embodiments, carbon dioxide may react with alcohols to form an alkyl carbonate compound. In some embodiments, an alkyl carbonate compound may react with silicon oxides to produce silicon alkoxides. In some embodiments, carbon dioxide may be introduced directly into the system as a gas from a cylinder. In some embodiments, carbon dioxide may be introduced into the system as a supercritical fluid. In some embodiments, carbon dioxide may be added directly to the system in solid form (dry ice). In some embodiments, carbon dioxide may be introduced into the system indirectly via a carbonate compound, urea (carbamide), or both. In some embodiments, carbon dioxide may be released again upon reaction of alkyl carbonate with the silica source. In some embodiments, carbon dioxide may be recovered and reused. In some embodiments, an alkyl carbonate may serve as a coupling agent to couple an amine compound with silicon oxides. In some embodiments, the amine compound may be selected from the group of a primary amine, a secondary amine, a tertiary amine compound. In some embodiments, amine compound may be a primary amine. In some embodiments, the primary amine may comprise methylamine, ethylamine, propylamine, butylamine, pentylamine, hexylamine, octylamine, decylamine, 2-methylpropan-2-amine, 2-aminopentane, aniline, allylamine, tris(hydroxymethyl)aminomethane, 4,4'-oxydianiline, and/or 2,2'-dimethylbenzidine. Other primary amines may be possible. In some embodiments, the amine compound may be a secondary amine. In some embodiments, a secondary amine may comprise dimethylamine, diethylamine, ethylmethylamine, N-methylpropylamine, N-methylbutylamine, diisopropylamine, dibutylamine, dihexylamine, dioctylamine, didecylamine, diphenylamine, diallylamine, pyrrolidine, and/or allylcyclohexylamine. Other secondary amines may be possible. In some embodiments, the amine compound may be a tertiary amine. In some embodiments, a tertiary amine may comprise trimethylamine, tri ethyl amine, tripropyl amine, tributylamine, trihexylamine, trioctylamine, triisooctylamine, N,N-dimethylethylamine, N,N-diethylmethylamine, N,N-dimethylpropylamine, ethylenediaminetetraacetic acid, 3-dimethylamino-1-propanol, and/or triethanolamine. Other tertiary amines may be possible. In some embodiments, the alkyl or aryl group of the amine compound increase the hydrophobicity of silicon oxides. In some preferred embodiments, the coupled amine compound may be the same compound as the amine base used to form the silicon alkoxides, to form the sol-gel material, or both.

In some embodiments, the reaction of hydroxyl-containing organic molecules with silicon oxides may occur in a batch reactor, a continuous stirred tank reactor, continuous stirred reactors in series, a plug flow reactor, or a combination thereof. In some embodiments, the reaction of hydroxyl-containing organic molecules with silicon oxides may occur in a batch reactor, a continuous stirred tank reactor or a plug flow reactor. Other reactors may be possible. In some embodiments, the optimal reactions conditions may be achieved in the reactor, comprising pressure, temperature, volume, residence time, concentration of reagents/products, enthalpy, internal energy, flow rate. In some embodiments, the reactor may be provided with a dehydrating capability, comprising a water separation film, distillation column, or a (ex-situ) molecular sieve. In some embodiments, a batch reactor may be used to produce silicon alkoxides. In some preferred embodiments, the batch reactor is a heavy-wall pressure vessel such as an autoclave. In some embodiments, the hydroxyl-containing organic molecules, silicon oxide, dehydrating substance, base, and other reagents and/or additives may be fed into the batch reactor simultaneously or in a certain sequential order of adding. In some embodiments, the hydroxyl-containing organic molecules, dehydrating substance, base, and other reagents and/or additives may be fed into the batch reactor and mixed before the addition of the silicon oxide. In some embodiments, the reactor may be charged with carbon dioxide. In some embodiments, a continuous stirred tank reactor may be used. In some embodiments, silicon oxide, base, additives may be fed into the reactor under stirring followed by the continuous addition of a mixture of the hydroxyl-containing organic molecules and dehydrating agent, in liquid or vapor form. In some embodiments, the hydroxyl-containing organic molecules and dehydrating agent may be mixed in advance in another continuous stirred tank reactor. In some embodiments, a plug flow reactor may be used. In some embodiments, silicon oxide, base, additives may be fed into the reactor followed by the continuous addition of a mixture of the hydroxyl-containing organic molecules and dehydrating agent, in liquid or vapor form. In some embodiments, the hydroxyl-containing organic molecules and dehydrating agent may be accompanied with a carbon dioxide stream. In some embodiments, a carrier gas may be used to feed the hydroxyl-containing organic molecules, dehydrating agent, and carbon dioxide in the reactor. In some embodiments, the carrier gas may be carbon dioxide, or other inert gases comprising nitrogen and argon gas. In some preferred embodiments, the carrier gas may be carbon dioxide. In some embodiments, silicon alkoxides may be formed and collected continuously.

In some embodiments, one or more hydroxyl-containing organic molecules may react with a silicon oxide from a silica containing feed to form a silicon alkoxide, which may proceed if the reaction takes place at an elevated pressure. In some embodiments, the reaction pressure may be higher than the atmospheric pressure (0.101325 MPa). In some embodiments, the reaction pressure may be higher than 1 MPa. In some embodiments, the reaction pressure may be 20 MPa or less. In some preferred embodiments, the reaction pressure may be about 1-10 MPa.

In some embodiments, one or more hydroxyl-containing organic molecules may react with a silicon oxide from a silica containing feed to form a silicon alkoxide, which may proceed if the reaction takes place at an elevated temperature. In some embodiments, the reaction temperature may be 60° C. or higher. In some embodiments, the reaction temperature may be 80° C. or higher. In some embodiments, the reaction temperature may be 500° C. or less. In some preferred embodiments, the reaction temperature may be in the range of about 100-300° C.

In some embodiments, the reaction of hydroxyl-containing organic molecules with silicon oxides may be performed with the help of dielectric heating. In some embodiments, dielectric heating may be referred to as heating by application of electromagnetic waves. In some preferred embodiments, the electromagnetic waves produced with dielectric heating are microwaves. In some embodiments, dielectric heating comprises heating via microwave radiation. In some embodiments, the radiation of alternating electromagnetic waves, such as microwaves, may cause liquid molecules to rotate and align their electric dipoles. In some embodiments, the increase in the overall molecular vibration may result in the generation of heat. In some embodiments, the microwave radiation may be generated by a magnetron. In some preferred embodiments, the frequency of the radiation may be between 0.5 GHz and 5 GHz. In some embodiments, the microwave power may be between about 200-700 W. In some preferred embodiments, the microwave power may be about 400-600 W.

In some embodiments, sonication may be applied to the mixture of hydroxyl-containing organic molecules and silicon oxides (and any additives) to provide energy for the chemical reaction to form alkoxides. In some embodiments, sonication may induce acoustic cavitation. In some embodiments, the acoustic cavitation may result in transient cavities which may attain high temperatures and pressures. In some embodiments, sonication may produce cavitation bubbles in the solution, which may grow and collapse. In some embodiments, the collapse of the cavitation bubbles may result in transient, local, and short-lived spots of high pressure and temperature. In some embodiments, in the produced centers of high pressure and temperature, atoms and radicals may be combined. In some embodiments, the collapse of the cavitation bubbles may result in shockwaves that may propagate throughout the solution. In some embodiments, the produced shockwaves may improve the homogeneity of the solution. In some embodiments, sonication may induce the reaction of one or more hydroxyl-containing organic molecule with a silicon oxide from a silica containing feed to form a silicon alkoxide. In some embodiments, sonication may also improve the extraction of silicon oxides from the silica containing feed. In some embodiments, the soundwaves produces during sonication may be generated by a sonicator. In some embodiments, the soundwaves produces during sonication may be generated by a sonic probe. In some embodiments, the soundwaves produces during sonication may be generated in a sonic bath. In some embodiments, the soundwaves may have a frequency of about 20 kHz. In some embodiments, the soundwaves may have a frequency of higher than 20 kHz, also referred to as "ultrasonication". In some embodiments, ultrasonication may be preferred. In some embodiments, the ultrasonic frequencies may be applied using an ultrasonic probe or ultrasonic bath.

In some embodiments, the reaction time during which hydroxyl-containing organic molecules react with silicon oxides to form silicon alkoxides may be 1 hour or more. In some embodiments, the reaction time during which hydroxyl-containing organic molecules react with silicon oxides may be more than 4 hours. In some embodiments, the reaction time during which hydroxyl-containing organic molecules react with silicon oxides may be more than 8 hours. In some embodiments, the reaction time during which hydroxyl-containing organic molecules react with silicon oxides may be more than 12 hours. In some embodiments, the reaction time during which hydroxyl-containing organic molecules react with silicon oxides may be less than 120 hours. In some preferred embodiments, the reaction time during which hydroxyl-containing organic molecules react with silicon oxides may be less than 72 hours.

In some embodiments, the mixture comprising silicon oxides, hydroxyl-containing molecules, and additives may have a silica concentration in the range of about 1 to 15 wt % (percentage by mass). In some preferred embodiments, the mixture comprising silicon oxides, hydroxyl-containing molecules, and additives may have a silica concentration less than 10 wt %.

In some embodiments, alkoxides may be formed at a yield of 50%. In some embodiments, alkoxides may be formed at a yield of 60%. In some embodiments, alkoxides may be formed at a yield of 70%. In some preferred embodiments, alkoxides may be formed at a yield of 80% or higher. Yet in some more some preferred embodiments, alkoxides may be formed at a yield of 90% or higher.

In some embodiments, the alkoxide blend may be converted into a sol. In some embodiments, a sol may comprise a colloidal suspension in which solid nanostructures are dispersed in a continuous liquid phase. In some embodiments, the solid nanostructures comprise nanoparticles, nanotubes, nanoplatelets, oligomers, and/or polymer aggregates. Other solid nanostructures are possible. In some preferred embodiments, oligomers and polymer aggregates may be preferred as solid phase of the sol. In some embodiments, the sol may be converted into a gel. In some embodiments, a gel may comprise a colloidal system which may consist of a continuous nanostructured solid 3D network enclosing a dispersed continuous liquid phase. In some preferred embodiments, the formation of a sol may start directly after formation of the alkoxide blend. In some preferred embodiments, the formation of a gel may start directly after formation of the sol.

In some embodiments, the alkoxide blend may be converted into a sol via hydrolysis and condensation reactions. In some embodiments, the alkoxide blend may be converted into a sol via aggregation of nanoparticles. In some embodiments, hydrolysis may comprise the replacements of alkoxide groups (—OR) with reactive hydroxyl groups (—OH). In some embodiments, hydrolysis may take place in the presence of water. In some embodiments, the molar ratio water/silicon may vary between about 0.5 and 50. In some embodiments, the molar ratio water/silicon may be higher than about 1. In some embodiments, the molar ratio water/silicon may be lower than about 50. In some embodiments, the molar ratio water/silicon may be lower than about 25. In some preferred embodiments, the molar ratio water/silicon may vary between about 1 and 10.

In some embodiments, hydrolysis of the alkoxide may be catalyzed. In some embodiments, hydrolysis of the alkoxide may be catalyzed by an acid. In some embodiments, the acid comprises hydrogen chloride, hydrogen sulfate, nitric acid, hydrogen fluoride, hydrogen iodide, hydrogen bromide, hydrogen phosphate, acetic acid, oxalic acid, citric acid, and/or formic acid. In some preferred embodiments, hydrogen chloride, nitric acid, hydrogen sulfate, or acetic acid may be used.

In some embodiments, hydrolysis of the alkoxide may be catalyzed by a base. In some embodiments, the base may be selected from the group of an alkali metal hydroxide, an alkaline earth metal compound, ammonia, ammonium hydroxide, a primary amine, a secondary amine, a tertiary amine, a quaternary amine compound. In some embodiments, the base may be an alkali metal compound or an alkaline earth metal compound or a combination of both. In some preferred embodiments, the alkali metal compound may be an alkali metal hydroxide comprising lithium hydroxide (LiOH), sodium hydroxide (NaOH), potassium hydroxide (KOH), and/or cesium hydroxide (CsOH). In some preferred embodiments, the alkaline earth metal compound may be an alkaline earth metal compound comprising beryllium hydroxide ($Be(OH)_2$), magnesium hydroxide ($Mg(OH)_2$), calcium hydroxide ($Ca(OH)_2$), strontium hydroxide ($Sr(OH)_2$), barium hydroxide ($Ba(OH)_2$), and/or radium hydroxide ($Ra(OH)_2$). In some embodiments, one or more bases may be used for the hydrolysis of the alkoxide. In some preferred embodiments, the hydrolysis of the alkoxide may be performed in the presence of sodium hydroxide or potassium hydroxide. In some embodiments, the base may be a primary amine. In some embodiments, the primary amine may comprise methylamine, ethylamine, propylamine, butyl amine, pentyl amine, hexylamine, octyl amine, decylamine, 2-methylpropan-2-amine, 2-aminopentane, aniline, allylamine, tris(hydroxymethyl)aminomethane, 4,4'-oxydianiline, and/or 2,2'-dimethylbenzidine. Other primary amines may be possible. In some embodiments, the base may be a secondary amine. In some embodiments, a secondary amine may comprise dimethylamine, diethylamine, ethylmethylamine, N-methylpropylamine, N-methylbutylamine, diisopropylamine, dibutylamine, dihexylamine, dioctylamine, didecylamine, diphenylamine, diallylamine, pyrrolidine, and/or allylcyclohexylamine. Other secondary amines may be possible. In some embodiments, the base may be a tertiary amine. In some embodiments, a tertiary amine may comprise trimethylamine, triethylamine, tripropylamine, tributylamine, trihexylamine, trioctylamine, triisooctylamine, N,N-dimethylethylamine, N,N-diethylmethylamine, N,N-dimethylpropylamine, ethylenediaminetetraacetic acid, 3-dimethylamino-1-propanol, and/or triethanolamine. Other tertiary amines may be possible. In some embodiments, the base may be a quaternary amine compound. In some embodiments, a quaternary amine compound may comprise tetramethylammonium hydroxide, tetraethylammonium hydroxide, tetrapropylammonium hydroxide, tetraisopropylammonium hydroxide, tetrabutylammonium hydroxide, and/or didecyldimethylammonium hydroxide. Other quaternary amine compounds may be possible.

In some embodiments, hydrolysis of the alkoxide may be catalyzed by an ammonium salt. In some embodiments, an ammonium salt may comprise ammonium bromide, ammonium carbonate, ammonium chloride, ammonium iodide, ammonium sulfate. In some embodiments, an ammonium salt may comprise a quaternary ammonium salt, comprising tetramethylammonium bromide, tetramethylammonium carbonate, tetramethylammonium chloride, tetramethylammonium iodide, tetramethylammonium sulfate, tetraethylammonium bromide, tetraethylammonium carbonate, tetraethylammonium chloride, tetraethylammonium iodide, tetraethylammonium sulfate, tetrapropylammonium bromide, tetrapropylammonium carbonate, tetrapropylammonium chloride, tetrapropylammonium iodide, tetrapropylammonium sulfate, tetraisopropylammonium bromide, tetraisopropylammonium carbonate, tetraisopropylammonium chloride, tetraisopropylammonium iodide, tetraisopropylammonium sulfate, didecyldimethylammonium bromide, didecyldimethylammonium carbonate, didecyldimethylammonium chloride, didecyldimethylammonium iodide, didecyldimethylammonium sulfate. Other ammonium salts and quaternary ammonium salts may be possible. In some preferred embodiments, diethylamine or triethylamine may be used as amine base.

In some embodiments, hydrolysis of the alkoxide may be catalyzed by a fluoride compound. In some embodiments, a fluoride compound may comprise lithium fluoride (LiF), sodium fluoride (NaF), potassium fluoride (KF), beryllium fluoride ($BeF_2$), magnesium fluoride ($MgF_2$), calcium fluoride ($CaF_2$), barium fluoride ($BaF_2$), aluminum fluoride ($AlF_3$), cadmium fluoride ($CdF_2$), ammonium fluoride ($NH_4F$), tetramethylammonium fluoride, tetraethylammonium fluoride, tetraisopropylammonium fluoride, tetrabutylammonium fluoride. Other fluoride compounds may be possible. In some preferred embodiments, sodium fluoride, ammonium fluoride, and/or tetrabutylammonium fluoride may be used.

In some embodiments, the hydrated form of dehydrating agents, which were used to continuously remove water released during the formation of the silicon alkoxides, may alter the pH of the system when water is added back to the system to induce hydrolysis of the alkoxides. In some embodiments, an inorganic dehydrating agent may be hydrated to a basic component, which may induce a more basic hydrolysis of the alkoxides. For example, calcium oxide (CaO), sodium oxide ($Na_2O$), potassium oxide ($K_2O$) may get hydrated and converted to calcium hydroxide ($Ca(OH)_2$), sodium hydroxide (NaOH), potassium hydroxide (KOH), respectively. In some embodiments, a water scavenger such as an organic acid anhydride may be hydrated to an acidic component, which may induce a less basic or even acidic hydrolysis of the alkoxides. For example, acetic anhydride may get hydrated and converted to acetic acid. In some embodiments, a water scavenger such as an acetal may be used and hydrated to components without a significant acidic or basic nature. For example, acetone dimethyl acetal (2,2-dimethoxypropane) may get hydrated and converted to methanol and acetone. In some embodiments, a proton scavenger such as an epoxide may be used, which instead of removing water may remove a proton ($H^+$) which otherwise would react with hydroxide ($OH^-$) to form the co-product water during the formation of the alkoxides. For example, the epoxides ethylene oxide, propylene oxide, 1,2-epoxybutane, and/or epichlorohydrin may be used. In some embodiments, as a result of the removal of hydrogen ions ($H^+$) by the proton scavenger and the formation of hydroxide ($OH^-$), a more basic hydrolysis of the alkoxides may be induced. In some embodiments, a dehydrating agent or a combination of dehydrating agents may be selected based on the product(s) formed after hydration of these agents in order to control the pH of the system during hydrolysis of the alkoxides.

In some embodiments, condensation reactions may take place in parallel to the hydrolysis of the alkoxides. In some embodiments, condensation reactions may comprise the reaction of silanol groups to form siloxane bonds. In some embodiments, the dispersed particles in the sol may form aggregates or oligomers (small polymers). In some embodiments, in a first stage, the aggregates or oligomers may grow by further aggregation or polymerization, respectively. In some embodiments, in a second stage, the aggregates or oligomers may bond with each other to form a continuous cluster or network that spans the liquid. In some embodiments, the formation and grow of aggregates and oligomers may occur via condensation reactions. In some embodiments, aggregation and polymerization may comprise the formation of siloxane bonds. In some embodiments, the formation of a continuous cluster or network that spans the liquid may result in a gel. In some embodiments, the formation of a continuous cluster or network composed of silica nanostructures that spans the liquid may result in a silica gel.

In some embodiments, condensation reactions may occur after and/or during base-catalyzed hydrolysis. In some preferred embodiments, hydrolysis of the alkoxide and/or formation of the silica gel may be catalyzed by the base used to catalyze formation of the alkoxide. In some preferred embodiments, formation of the alkoxides, hydrolysis of the alkoxides, and formation of the silica gel may occur subsequently in the presence of the same catalyst. In some preferred embodiments, hydrolysis of the alkoxide and/or formation of the silica gel may be catalyzed by potassium hydroxide (KOH). In some preferred embodiments, hydrolysis of the alkoxide and formation of the silica gel may be catalyzed by potassium hydroxide. In some preferred embodiments, formation of the alkoxides, hydrolysis of the alkoxides, and formation of the silica gel may be catalyzed by potassium hydroxide, sodium hydroxide, and/or ammonia.

In some embodiments, hydrolysis of the silicon alkoxide and/or formation of the silica gel may be performed in the presence of a surfactant. In some embodiments, the surfactant may prevent phase separation between hydrophobic condensates and polar compounds. In some embodiments, the surfactant may comprise an anionic, a cationic, and/or a nonionic surfactant, such as a surfactant selected from the group comprising sodium dodecyl sulfate (SDS), n-hexadecyltrimethylammonium bromide (CTAB), n-hexadecyltrimethylammonium chloride (CTAC), polyoxyethylene octylphenyl ether, polyoxyethylene nonylphenyl ether, diethylene glycol monooctyl ether, pluronic F-127, and mixtures thereof. Other surfactants may be possible.

In some embodiments, the silica concentration of the alkoxide blend may be adjusted before being converted into a sol and subsequently a gel. In some embodiments, the silica concentration may be increased via removal of some of the hydroxyl-containing organic molecules. In some embodiments, removed hydroxyl-containing organic molecules may be collected and used to produce new alkoxides. In some embodiments, the silica concentration of the sol may be in the range of about 3-15 wt % silica. In some preferred embodiments, the silica concentration of the sol may be in the range of about 4-wt % silica.

In some embodiments, the sol may be formed in a reactor. In some embodiments, the sol may be formed by pouring the alkoxide blend with hydroxyl-containing organic molecules, catalyst, water, additives into a reactor. In some embodiments, the sol may be formed by pouring the alkoxide blend with hydroxyl-containing organic molecules, catalyst, water, additives into a reactor under continuous stirring. In some embodiments, stirring may result in a faster formation of the sol. In some embodiments, stirring may result in a more homogeneous sol. In some embodiments, the stirring rate may be in the range of about 100 to 1000 rpm. In some preferred embodiments, the stirring rate may be in the range of about 200 to 500 rpm. In some embodiments, the sol may be formed in a batch reactor. In some embodiments, the sol may be formed in a continuous stirred tank reactor. In some embodiments, the sol may be formed in a plug flow reactor.

In some embodiments, the sol may be heated in order to improve and/or maintain homogeneity. In some embodiments, heating may accelerate hydrolysis and/or condensation reactions. In some embodiments, the sol may be heated to a temperature higher than 30° C. In some embodiments, the sol may be heated to a temperature in the range from about 40° C. to 150° C. In some embodiments, the sol may be heated to a temperature less than 150° C. In some embodiments, the sol may be heated via dielectric heating. In some embodiments, dielectric heating comprises heating via microwave radiation.

The obtained sol can then be converted into a gel as part of the aerogel production process. In some embodiments, the conversion of sol to gel may also be termed gelation. In some embodiments, the conversion of the sol to the gel may take about a few seconds. In some embodiments, the conversion of the sol to the gel may take about a few minutes. In some embodiments, the conversion of the sol to the gel may take about 15 minutes or more. In some embodiments, the conversion of the sol to the gel may take about 30 minutes or more. In some embodiments, the conversion of the sol to the gel may take about 1 hour. In some embodiments, the conversion of the sol to the gel may take about 4 hours. In some embodiments, the conversion of the sol to the gel may take about 8 hours. In some preferred embodiments, the conversion of the sol to the gel takes less than 12 hours.

In some embodiments, gelation may proceed at a temperature higher than room temperature. Those of ordinary skill in the art would understand room temperature to be the temperature of the environment in which the drying is performed. In some embodiments, room temperature may be between about 20° C. and about 25° C. In some embodiments, an elevated temperature may result in a faster gelation. In some embodiments, an elevated temperature may result in a more homogenous gelation. In some preferred embodiments, gelation may take place at a temperature in the range of about 30 to 60° C. In some embodiments, the sol-gel process may be heated via dielectric heating. In some embodiments, dielectric heating comprises heating via microwave radiation.

In some embodiments, gelation may occur in the same reactor used to produce the sol. In some embodiments, a sol may be fed into another reactor to produce a gel. In some embodiments, gelation may proceed under stirring. In some embodiments, stirring may result in a faster gelation. In some embodiments, stirring may result in a more homogeneous gelation. In some embodiments, the stirring rate may be in the range of about 100 to 1000 rpm. In some preferred embodiments, the stirring rate may be in the range of about 200 to 500 rpm. In some preferred embodiments, the stirring may be performed as an initial step during gelation and may be ended before reaching the gel point. In some embodiments, the gel point may be understood as the point in time at which the viscosity of the sol-gel material rises abruptly.

In some embodiments, the network of the silica gel (and thus aerogel obtained therefrom) may be mechanically reinforced with an organic polymer. In some embodiments, an organic polymer may react with one or more aggregates and/or oligomers in a sol. In some embodiments, an organic polymer may react with one or more aggregates and/or oligomers during the sol-gel process. In some embodiments, an organic polymer may react with the spanning cluster during the sol-gel process. In some embodiments, an organic polymer may react with one or more remaining reactive functional groups on the silica network of the gel. In some embodiments, the reactive functional groups may comprise a hydroxyl, a vinyl, an epoxide, an amine, an ester, an alkyl chain.

In some embodiments, an organic polymer may bond to remaining silanol groups on the silica network (backbone) of the gel. In some embodiments, elimination of remaining silanol groups on the silica network by reactions with sterically-hindered hydrophobic groups and/or organic polymers may prevent the pore walls (struts) of the silica backbone to stick to each other upon shrinkage of the gel during evaporative drying. In some embodiments, elimination of remaining silanol groups on the silica network of the gel may enable shrinkage of the gel to be prevented, minimized or reversed.

In some embodiments, organic polymers may be integrated into the silica network. In some embodiments, the silica network may be interpenetrated with organic polymers. In some embodiments, an organic polymer may conformally coat the interior contour surfaces of the silica network. In some embodiments, the silica network may be reinforced via cross-linking with organic polymers. In some embodiments, the cross-linking may comprise a covalent bond between the polymer and silicon oxide network. In some embodiments, the polymer may render the silica network more flexible. In some embodiments, the polymer may enhance the toughness of the silica (aero)gel. In some embodiments, the polymer may enhance the compression strength of the silica (aero)gel. In some embodiments, the polymer may enhance the flexural strength of the silica (aero)gel. In some embodiments, the polymer reinforcement may result in less volume shrinkage during evaporative drying of the gel into an aerogel or xerogel. In some embodiments, the organic polymer may comprise a polymer derived from an isocyanate, an epoxide, an amine, a carboxylic acid, or an alcohol. In some preferred embodiments, the organic polymer may comprise a polyol, a polyacrylate, and/or a polyvinyl. In some preferred embodiments, the polymer may comprise a polyol. In some preferred embodiments, the polymer may comprise polyvinyl alcohol and/or polyvinyl acetate.

In some embodiments, a silicon alkoxide may contain a vinyl group originating from an unsaturated alcohol. In some embodiments, radical polymerization of the vinyl groups may occur prior, during, and/or after the sol-gel process (hydrolysis and condensation reactions). In some embodiments, radical polymerization of vinyl groups on the silicon alkoxides, silica oligomers, and/or silica network may lead to mechanically reinforced gels and aerogels (or xerogels). In some embodiments, radical polymerization of vinyl groups may be initiated in the presence of a radical initiator comprising an azo compound, an organic peroxide, an inorganic peroxide, a halogen initiator, or any suitable initiator compound. In some embodiments, the azo compound may comprise azobisisobutyronitrile (AIBN), 1,1'-azobis(cyclohexanecarbonitrile) (ACHN). In some embodiments, the organic peroxide may comprise di-tert-butyl peroxide (DTBP), benzoyl peroxide, methyl ethyl ketone peroxide, acetone peroxide. In some embodiments, the inorganic peroxide may comprise a peroxydisulfate salt selected from the group comprising sodium persulfate, potassium persulfate, ammonium persulfate. In some embodiments, the halogen initiator may be a diatomic halogen molecule comprising difluorine (molecular fluorine, $F_2$), dichlorine (molecular chlorine, $Cl_2$), dibromine (molecular bromine, $Br_2$). In some embodiments, the rate and degree of polymerization of the vinyl groups may be controlled by a series of parameters comprising temperature, pressure, polymerization time, initiator concentration, stirring rate.

In some embodiments, condensation reactions may still take place after the formation of a gel. In some embodiments, the gel may be allowed to sit, which may be referred to as "aging". In some embodiments, aging may take place at a temperature in the range from about room temperature to 60° C. In some embodiments, gels may age at a temperature in the range from about room temperature to 60° C. generated by dielectric heating such as microwave radiation. In some embodiments, the gel may be sprayed with a liquid phase comprising a low surface tension, preferably less than 20 mN/m to prevent or minimize shrinkage (syneresis) during aging. In some preferred embodiments, hydroxyl-containing organic molecules such as methanol, ethanol, isopropanol, or tert-butanol may be sprayed on the gels. In some embodiments, a combination of different alcohols may be used. In some embodiments, the gels may be sprayed with tetrahydrofuran (THF). In some embodiments, the gel may be sprayed with an alkane. In some embodiments, the alkane may comprise butane, pentane, hexane, and/or heptane.

In some embodiments, gels may be produced in a continuous manner. In some embodiments, sols may be continuously poured into molds to obtain monolithic gels (blocks, tiles, cylinders, etc.) on a conveyer belt or other transport device.

In some embodiments, the sol may be formed or poured into a reactor or mold in the presence of a reinforcing material. In some embodiments, the sol may be formed or poured into a reactor or mold in the presence of a fibrous reinforcing material comprising fibers, a fibrous nonwoven web, mats, blankets, grids, glass wool, rock wool, or mixtures thereof. In some embodiments, the fibers may comprise glass fibers, flax fibers, bamboo fibers, cellulose fibers, cellulose nanofibers, polyester fibers, polyamide (PA or nylon) fibers, polyethylene (PE) fibers, polyethylene terephthalate (PET) fibers, polyurethane (PU) fibers, vegetable fibers, or a combination thereof. In some embodiments, the fibrous nonwoven web may comprise organic webs, inorganic webs, webs composed of natural fibers, and/or webs composed of (semi-)synthetic fibers. In some embodiments, a sol may be continuously impregnated/injected while becoming a gel in a fibrous nonwoven web, mat, blanket, grid, glass wool, or rock wool on a conveyer belt. In some embodiments, aerogel composites such as fiber-reinforced aerogel panels or aerogel blankets may be obtained after drying.

In some embodiments, discrete gel particles or granules may be formed by spraying sol droplets into or onto a flowing medium such as a bath. In some embodiments, a spray of sol droplets may be obtained by flowing the sol through a dispensing nozzle. In some embodiments, the position, orifice, and/or angle of the nozzle may be adjusted to control the particle size of the sol droplets. In some embodiments, a jet cutting method may be used in order to obtain gels in the form of particles or beads. In some embodiments, the jet cutting may comprise the cutting of a liquid jet of a sol by a rotating cutting disc. In some embodiments, gel particles or beads may be obtained having a particle size distribution ranging from a few hundred micrometers to several millimeters depending on the jet cutting settings comprising nozzle diameter, jet velocity, cylinder ratio, cutting frequency.

In some embodiments, the gels may be transported through a bath of solvent, with or without the help of a conveyer. In some embodiments, the bath may consist of an inlet and/or an outlet through which a fluid may be transported. In some embodiments, the bath may consist of more than one inlet and/or outlet to control the flow of the fluid. In some embodiments, a circulation flow may be implemented and maintained. In some embodiments, a conveyer belt may be installed in the bath. In some embodiments, the sol droplets may complete gelation while being transported through the bath.

In some embodiments, gels provided in the form of monoliths, chunks, granules, aggregates, particles, or a combination thereof. In some embodiments, gels provided in the form of monoliths, chunks, granules, aggregates, particles, or a combination thereof, may be regular in shape. In some embodiments, gels provided in the form of monoliths, chunks, granules, aggregates, particles, or a combination thereof, may be irregular in shape. In some embodiments, a portion of the gels provided in the form of monoliths, chunks, granules, aggregates, particles, or a combination thereof, may be regular in shape. In some embodiments, gels provided in the form of monoliths, chunks, granules, aggregates, particles, or a combination thereof, may be pulverized into smaller particles or powder before drying. In some embodiments, smaller gel particles may dry faster than larger gel particles or gel monoliths. In some embodiments, drying of gel particles may result in aerogel particles. In some embodiments, aerogel particles comprise aerogel granules and/or aerogel powder.

In some embodiments, depending on the degree of hydrolysis of the alkoxides, the resulting gel may exhibit a certain hydrophobicity due to the presence of alkoxy groups on the solid network of the gel.

In some embodiments, aerogel may be synthesized by removal of the pore liquid of a gel with minimal to no change to the porous nanostructured solid network of the gel. In some embodiments, drying of a gel into an aerogel may be performed at ambient pressure. In some embodiments, ambient pressure drying comprises drying via evaporation of the liquid phase at about atmospheric or ambient pressure. In some embodiments, ambient pressure may be the pressure exerted by the medium of the immediate environment, within the normal variations caused by elevation and/or barometric pressure fluctuations in normal operations under various weather conditions and locations of installation, without additional pressure raised with the help of a pressure vessel.

In some embodiments, two main requirements may be taken into account in order to successfully dry gels and obtain aerogels via ambient pressure drying. In some embodiments, the first requirement may be hydrophobization, more specifically the replacement of the free silanol groups on the silica backbone of the gel by hydrophobic groups, which may prevent the formation of siloxane bonds in case of shrinkage of the envelope volume of the gel during drying when the pore walls may be getting close to each other due to capillary stresses. In some embodiments, elimination of remaining silanol groups on the silica network of the gel may enable shrinkage of the gel to be prevented, minimized or reversed. In some embodiments, the second necessity next to a hydrophobic gel network in order to obtain aerogel via ambient pressure drying may be that the pore liquid of the gel has a relatively low surface tension in order to minimize capillary stresses during evaporative drying, which may be responsible for shrinkage of the envelope volume. In some embodiments, a polymer-reinforced silica network may better withstand capillary stresses during evaporative drying. In some embodiments, an organic polymer may react with remaining silanol groups on the silica network.

In some embodiments, the hydrophobic group comprises the hydrocarbon chain of an alcohol. In some embodiments, the alcohol comprises methanol, ethanol, isopropanol, n-propanol, tert-butanol, sec-butanol, n-butanol, n-pentanol, n-hexanol, and/or an amyl alcohol (primary, secondary, and/or tertiary). Other alcohols are possible. In some preferred embodiments, the alcohol may be methanol, ethanol, isopropanol, or tert-butanol. In some embodiments, a combination of different alcohols may be used. In some embodiments, the hydrophobic group comprises the hydrocarbon chain of a fatty alcohol. In some embodiments, the fatty alcohol may be an aliphatic alcohol typically consisting of a chain of 8 to 26 carbons, although fatty alcohols with chains of fewer or more carbons exist as well. In some embodiments, the fatty alcohol may be obtained from a natural source such as fats and oils found in plants. In some embodiments, a fatty alcohol may be obtained from a fatty ester. In some embodiments, a fatty alcohol may be obtained by reacting a fatty ester with hydrogen gas ($H_2$) at elevated temperature and pressure. In some embodiments, a fatty alcohol may be obtained by reacting a fatty ester with hydrogen gas ($H_2$) at supercritical conditions. In some embodiments, the fatty alcohol comprises capryl alcohol (1-octanol), pelargonic alcohol (1-nonanol), capric alcohol (1-decanol), hendecanol (1-undecanol), lauryl alcohol (1-dodecanol), myristyl alcohol (1-tetradecanol), cetyl alcohol (1-hexadecanol), palmitoleyl alcohol (cis-9-hexadecen-1-ol), stearyl alcohol (1-octadecanol), oleyl alcohol (1-octadecenol), arachidyl alcohol (1-eicosanol), behenyl alcohol (1-docosanol), erucyl alcohol (cis-13-docosen-1-ol), and/or ceryl alcohol (1-hexacosanol). In some preferred embodiments, the fatty alcohol may be lauryl, stearyl, or oleyl alcohol.

In some embodiments, the hydrophobic group comprises the hydrocarbon chain of a fatty acid/ester. In some embodiments, the fatty acid may be saturated or unsaturated. In some embodiments, the saturated fatty acid comprises caprylic acid, capric acid, lauric acid, myristic acid, palmitic acid, stearic acid, arachidic acid, behenic acid, lignoceric acid, and cerotic acid. Other saturated fatty acids are possible. In some preferred embodiments, the saturated fatty acid may be palmitic and/or stearic acid. In some embodiments, the unsaturated fatty acid comprises myristoleic acid, palmitoleic acid, sapienic acid, oleic acid, elaidic acid, vaccenic acid, linoleic acid, arachidonic acid, and/or erucic acid. Other unsaturated fatty acids are possible. In some preferred embodiments, the unsaturated fatty acid may be oleic and/or linoleic acid.

In some embodiments, the hydrophobization set point temperature may be between room temperature and 70° C. In some preferred embodiments, the hydrophobization set point temperature may be about 60° C.

In some embodiments, the hydrophobic group may be attached to the silica gel with the assistance of dielectric heating comprising microwave radiation. In some embodiments, homogeneously increasing the temperature of pore liquid via energy dissipation from microwave radiation may speed up and complete covalent bonding of hydrophobic groups to the silica backbone of the gel. In some embodiments, the hydroxyl group of the alcohol may react with a silanol group of the silica gel with the assistance of microwave radiation. In some embodiments, the hydroxyl group of the fatty alcohol may react with a silanol group of the silica gel with the assistance of microwave radiation. In some embodiments, the carboxyl group of the fatty acid reacts with a silanol group of the silica gel with the assistance of microwave radiation. In some embodiments, an organic polymer may react with one or more silanol groups of the silica gel with the assistance of microwave radiation.

In some embodiments, a hydrophobic group may be attached to the silica gel at supercritical conditions of the pore liquid comprising at least one hydrophobe. In some embodiments, alkoxylation of the silanol groups on the silica network of the gel may occur. In some embodiments, the supercritical state of the pore liquid comprising at least one hydrophobe may allow a vapor-phase treatment, replacing silanol groups with hydrophobic end-groups. In some embodiments, an organic polymer may react with one or more silanol groups of the silica gel at supercritical conditions of the pore liquid.

In some embodiments, a hydrophobic group may be attached to the silica network as the network is still getting formed and expanding in volume via interconnection of silicon alkoxides and oligomers to form a gel. In some embodiments, organic polymers may be integrated into the silica network. In some embodiments, the silica network may be interpenetrated with organic polymers. In some embodiments, an organic polymer may conformally coat the interior contour surfaces of the silica network.

In some embodiments, the second necessity next to a hydrophobic gel network in order to obtain aerogel via ambient pressure drying may be that the pore liquid of the gel has a relatively low surface tension, lower than about 30 mN/m and preferably lower than about 20 mN/m, in order to have minimal capillary stresses during evaporative drying, which may be responsible for volumetric shrinkage. In some embodiments, the pore liquid may comprise, consist essentially of or consist of at least one of the hydroxyl-containing organic molecules of used to make the alkoxides. In some embodiments, the pore liquid may comprise, consist essentially of or consist of an alcohol. In some embodiments, the alcohol comprises methanol, ethanol, isopropanol, n-propanol, tert-butanol, sec-butanol, n-butanol, n-pentanol, n-hexanol, and/or an amyl alcohol (primary, secondary, and/or tertiary). Other alcohols are possible. In some preferred embodiments, the hydroxyl-containing organic molecule may be methanol, ethanol, isopropanol, or tert-butanol. In some embodiments, a combination of different alcohols may be used. In some embodiments, the pore liquid may comprise, consist essentially of or consist of acetone. In some embodiments, the pore liquid may comprise, consist essentially of or consist of tetrahydrofuran (THF). In some embodiments, the pore liquid may comprise, consist essentially of or consist of at least one alkane. In some embodiments, the alkane may comprise butane, pentane, hexane, and/or heptane. In some embodiments, the pore liquid may comprise, consist essentially of or consist of other components used within the described invention comprising water, esters, ethers, unreacted substances, fatty acids, fatty esters, fatty alcohols, additives, catalysts, dehydrating agents, water scavengers, and/or proton scavengers.

In some embodiments, the gel may be dried at ambient pressure after being sufficiently hydrophobized while holding a pore liquid with a relatively low surface tension.

Within the scope of the present invention, the drying temperature during ambient pressure drying may be between room temperature and 250° C. In some embodiments, excess of liquid enveloping and surrounding the gel may be removed before drying, for example via percolation. In some embodiments, the gel may first dry at room temperature for a couple of hours to 24 hours. In some embodiments, the drying temperature may be first set to about 50° C.-80° C. to remove excess of liquid on the outer surface of the gel, followed by a second drying temperature between about 120° C. and 170° C. to promote the springback effect, all at ambient pressure. In some preferred embodiments, the second drying temperature may be about 150-170° C., at ambient pressure. In some embodiments, a first drying may take about 2-24 hours followed by a second drying at elevated temperature for about 2-8 hours.

In some embodiments, elevated temperatures, typically in the range of 100-200° C. and preferably between 150-170° C., may induce the springback effect on the silica network. In some embodiments, the springback effect may comprise an initial shrinkage of the envelope volume of the gel, followed by an expansion in volume. In some embodiments, the term "springback effect" may be referred to as "reversible shrinkage". In some embodiments, the springback effect may comprise an initial envelope volume shrinkage of the gel, followed by an expansion in envelope volume, such that an aerogel may be obtained having a porosity higher than 50%, most of which are mesopores. In some embodiments, the springback effect may comprise an initial volume shrinkage of the gel, followed by an expansion in volume such that aerogel particles (monoliths, granules, and/or powder) may be obtained having a porosity higher than 50%, most of which are mesopores. In some embodiments, the springback effect may comprise an initial volume shrinkage of the gel, followed by an expansion in volume such that an xerogel may be obtained having a porosity lower than 50%. In some embodiments, the springback effect may comprise an initial volume shrinkage of the gel, followed by an expansion in volume such that xerogel particles (monoliths, granules, and/or powder) may be obtained having a porosity lower than 50%. In some embodiments, the initial shrinkage followed by the expansion in volume may result in a net volume shrinkage. In some embodiments, the initial shrinkage of the envelope volume may be more than 10%. In some embodiments, the initial shrinkage of the envelope volume may be more than 30%. In some embodiments, the initial shrinkage of the envelope volume may be more than 50%. In some embodiments, the initial shrinkage of the envelope volume may be more than 70%. In some embodiments, the initial shrinkage of the envelope volume may be more than 90%. In some embodiments, the net shrinkage of the envelope volume may be understood as the net shrinkage of envelope volume (in percentage) measured by first subtracting the final dry envelope volume of the aerogel/xerogel after the springback effect (expansion) from the original (wet gel) envelope volume before shrinkage, which may then be divided by the original (wet gel) envelope volume before shrinkage. In some embodiments, aerogel may be obtained comprising a net envelope volume shrinkage may be more than 5%. In some embodiments, aerogel may be obtained comprising a net envelope volume shrinkage may be more than 10%. In some embodiments, aerogel may be obtained comprising a net envelope volume shrinkage may be more than 20%. In some embodiments, aerogel may be obtained comprising a net envelope volume shrinkage may be more than 30%. In some embodiments, aerogel may be obtained comprising a net envelope volume shrinkage may be more than 40%. In some embodiments, xerogel may be obtained comprising a net envelope volume shrinkage may be more than 50%. In some embodiments, xerogel may be obtained comprising a net envelope volume shrinkage may be more than 60%. In some embodiments, xerogel may be obtained comprising a net envelope volume shrinkage may be more than 70%. In some embodiments, xerogel may be obtained comprising a net envelope volume shrinkage may be more than 80%. In some embodiments, the gel may seemingly not shrink in envelope volume (volume shrinkage less than 1%). In some embodiments, the gel may seemingly not undergo an initial shrinkage in envelope volume (volume shrinkage less than 1%). In some embodiments, the gel may undergo an initial shrinkage in envelope volume (volume shrinkage more than 1%), but the net envelope volume shrinkage may be negligible (net volume shrinkage less than 1%) due to the springback effect. In some embodiments, the net envelope volume shrinkage may be negative. In some embodiments, a negative net envelope volume shrinkage may be understood as a net envelope volume expansion. In some embodiments, instead of a net shrinkage, the gel may undergo a net expansion in envelope volume, due to the springback effect. In some embodiments, the net expansion in envelope volume may be understood as an increase in envelope volume of the final dry product compared to the envelope volume of the wet specimen. In some embodiments, an initial volume shrinkage may have occurred before the springback effect which resulted in a net volume expansion. In some embodiments, the net envelope volume expansion may be more than 5%. In some embodiments, the net envelope volume expansion may be more than 10%.

In some embodiments, ambient pressure drying may be performed with the help of dielectric heating. In some preferred embodiments, the electromagnetic waves produced with dielectric heating are microwaves. In some embodiments, aerogels may be synthesized by removal of the pore liquid with minimal to no change to the porous nanostructured solid network of the gel, via drying at ambient pressure and dielectric heating. In some embodiments, dielectric heating may be referred to as heating by application of electromagnetic waves. In some embodiments, dielectric heating comprises heating via microwave radiation. In some embodiments, the radiation of alternating electromagnetic waves, such as microwaves, may cause the liquid molecules of the pore fluid inside the gel to rotate and align their electric dipoles. In some embodiments, the increase in the overall molecular vibration may result in the generation of heat. In the sense of the present invention, the use of microwave radiation for drying is referred to as "microwave drying". In some embodiments, microwave drying may be considered a more careful approach of ambient pressure drying. In some embodiments, heat may be generated internally and homogeneously within the material promoting smaller thermal gradients inside the gel, less pore collapse and, higher porosity, and less cracks formed during drying. In some embodiments, the use of microwave radiation may lead to a reduction in drying time and energy consumption compared to conventional ambient pressure drying. In some embodiments, the microwave radiation may be generated by a magnetron. In some preferred embodiments, the frequency of the radiation may be between 0.5 GHz and 5 GHz. In some embodiments, the microwave power may be between about 200-700 W. In some preferred embodiments, the microwave power may be about 400-600 W. In some embodiments, the drying temperature may be kept between room temperature and 250° C. In some embodiments, the drying temperature may be kept between 50° C. and 200° C. In some preferred embodiments, the drying temperature may be kept between 120° C. and 170° C.

In some embodiments, drying of the wet gels may be done by circulation of a hot gas stream. In some embodiments, the gas may comprise air or an inert gas such nitrogen, helium, argon, carbon dioxide, and/or another inert gas.

In some embodiments, the drying of the gels may be performed in a continuous manner on a conveyer belt or other transport medium. In some embodiments, during continuous drying of the gels, the gels may be heated via dielectric heating for example via microwave irradiation and/or a hot gas flow.

In some embodiments, aerogels may be synthesized by removal of the pore liquid with minimal to no change to the porous nanostructured solid network of the gel by supercritically extracting the pore fluid from the gel, which is also referred to as "supercritical drying". Supercritical drying is the original method to obtain an aerogel, in which the pore liquid is first converted into a supercritical fluid, which may be extracted. In some embodiments, the term "supercritical fluid" refers to a fluid near and/or past its critical point, that exhibits little to no surface tension. In some embodiments, the supercritical fluid exhibits no surface tension and thus exerts no capillary forces when removed from the porous gel network, thus preventing collapse of the latter. In some embodiments, supercritical drying involves conditions at elevated temperatures and pressures near and/or past the critical point of the pore liquid, which may be provided by a heavy-wall pressure vessel. In some embodiments, the same heavy-wall pressure vessel for preparing the silicon alkoxides may be used. In some embodiments, the heavy-wall pressure vessel may be an autoclave.

In some embodiments, the aerogel production may be a continuous process comprising a continuous preparation of raw silica, a continuous formation of silicon alkoxides, a continuous sol-gel step, a continuous gel pulverization (optional), and a continuous drying. In some embodiments, the aerogel production may be a batch process, in which the formation of silicon alkoxides, the sol-gel step, and the drying may proceed in the same reactor, preferably a heavy-wall pressure vessel such as an autoclave. In some embodiments, the aerogel production may consist of batch and continuous production steps.

In some embodiments, all processing steps of the aerogel production requiring an elevated temperature (higher than room temperature) may be assisted by dielectric heating such as microwave radiation.

In some embodiments, the vapor phase generated via evaporation of the pore liquid of the wet gels may be collected, condensed back to liquid phase, and may be used to make new alkoxides and/or new sols.

In some embodiments, the aerogel comprises an alkoxy group on its surface. In some embodiments, an alkoxy group comprises a methoxy, ethoxy, isopropoxy, n-propoxy, tert-butoxy, sec-butoxy, n-butoxy, n-pentoxy, n-hexoxy, an alkoxy group of a fatty alcohol, and/or an alkoxy group of fatty acid. Other alkoxy groups are possible. In some embodiments, the alkoxy groups on the surface of silica aerogel may be referred to as "hydrophobic groups". In some embodiments, the silica aerogel comprises one or more hydrophobic side groups, the hydrophobic side groups comprising at least an alkoxy group and/or a fatty acid ester group. In some embodiments, certain alkoxy groups may offer some steric hindrance, which may be beneficial as these alkoxy groups may partially cover other silanol groups making the latter less or even not accessible to react with other silanol groups during gel drying or to bond with water molecules in case of an aerogel in a moist environment or when wetted, which otherwise may result in a second shrinkage upon evaporation of the moisture or water. According to certain but not necessarily all embodiments, the attachment of isopropoxy groups on the aerogel surface can be particularly advantageous. According to certain but not necessarily all embodiments, the attachment of tert-butoxy groups on the aerogel surface can be particularly advantageous. In some embodiments, isopropoxy groups and/or tert-boxy groups may be preferred for hydrophobization of the silica network due to their steric hindrance, which may involve overlapping near silanol groups, while still allowing for acceptable hydrolysis rates of the corresponding alkoxides. In some embodiments, the inner and outer surface of the aerogel may be rendered hydrophobic due to the presence of the alkoxy groups.

In some embodiments, an organic polymer may be integrated into the silica network of the aerogel. In some embodiments, the silica network of the aerogel may be interpenetrated with organic polymers. In some embodiments, an organic polymer may conformally coat the interior contour surfaces of the silica network. In some embodiments, the silica network may be reinforced via cross-linking with organic polymers. In some embodiments, the cross-linking may comprise a covalent bond between the polymer and silica network. In some embodiments, the polymer may render the silica network more flexible. In some embodiments, the polymer may enhance the toughness of the silica aerogel. In some embodiments, the polymer may enhance the compression strength of the silica aerogel. In some embodiments, the polymer may enhance the flexural strength of the silica aerogel.

In some embodiments, hydroxyl-containing organic molecules resulting from hydrolysis of the alkoxide, resulting from formation of the silica gel, resulting from excess addition, and resulting from the extraction of the pore liquid of the gel during drying may be recovered and used to make another alkoxide. In some embodiments, the hydroxyl-containing organic molecule comprises methanol, ethanol, isopropanol, n-propanol, tert-butanol, sec-butanol, n-butanol, n-pentanol, n-hexanol, a fatty acid, and/or a fatty alcohol. In some embodiments, other hydroxyl-containing organic molecules may be recovered and reused depending on the hydroxyl-containing organic molecules used to make the alkoxides, prepare the sol, hydrophobize the silica network, or a combination thereof. In some embodiments, the recovery of the hydroxyl-containing organic molecule may be performed in the presence of a desiccant or water scavenger. In some preferred embodiments, the recovery of the hydroxyl-containing organic molecule may be performed in the presence of the same desiccant or water scavenger used to make the silicon alkoxides.

In some embodiments, aerogel produced within the scope of the present invention may exhibit a different morphology, depending on the choice and number of alkoxides and/or process parameters. In some embodiments, the morphology of the silica aerogel may be difficult to achieve using different production approaches. In some embodiments, aerogel produced within the scope of the present invention may exhibit different textural properties depending on the choice and number of alkoxides and/or process parameters. In some embodiments, the textural properties of the silica aerogel may be difficult to achieve using different production approaches. In some embodiments, the silica network of the aerogel may consist of about 25% silica with tetrahedral silicon with maximum 3 oxygen atoms bridging with other silicon oxide bonds of the network. In some embodiments, the silica network of the aerogel may consist of about 30% silica with tetrahedral silicon with maximum 3 oxygen atoms bridging with other silicon oxide bonds of the network. In some embodiments, the silica network of the aerogel may consist of about 35% silica with tetrahedral silicon with maximum 3 oxygen atoms bridging with other silicon oxide bonds of the network. In some embodiments, the silica network of the aerogel may consist of about 25% silica with tetrahedral silicon with 3 oxygen atoms bridging with other silicon oxide bonds of the network and about 5% silica with tetrahedral silicon with maximum 2 oxygen atoms bridging with other silicon oxide bonds of the network. In some embodiments, the silica network of the aerogel may consist of about 25-30% silica with tetrahedral silicon with 3 oxygen atoms bridging with other silicon oxide bonds of the network and about 5-10% silica with tetrahedral silicon with maximum 2 oxygen atoms bridging with other silicon oxide bonds of the network. In some embodiments, the various silicon coordination in the aerogel network may be characterized via the chemical shifts in $^{29}$Si NMR spectra of the aerogel specimen. One of ordinary skill in the art would know how to obtain and analyze $^{29}$Si NMR spectra.

In some embodiments, the resulting aerogel may exhibit a low envelope density. One of ordinary skill in the art would know how to determine the envelope density of an aerogel. In some embodiments, envelope density may be calculated as density=mass/volume. In some embodiments, the mass may be accurately measured using a digital analytical balance with a precision of 0.001 g. In some embodiments, in case of simple geometries such as a cube, disc, or cylinder, the measurement of the envelope volume may be performed with the help of digital calipers. In some embodiments, the aerogel may come in the form of an irregular-shaped monolith, irregular-shaped granules, and/or powder. In some embodiments, in order to accurately determine the volume of irregular-shaped monoliths, irregular-shaped granules, and/or powder, a displaced medium conforming to the irregular surface contours without penetrating the pores may be used, for example by using a GeoPyc 1360 Density Analyzer of Micromeritics. In some embodiments, the resulting aerogel may exhibit an envelope density between about 0.05 g/cc (i.e., g/cm 3) and about 0.7 g/cc, between about 0.05 g/cc and about 0.6 g/cc, between about 0.05 g/cc and about 0.5 g/cc, between about 0.05 g/cc and about 0.4 g/cc, between about 0.05 g/cc and about 0.3 g/cc, between about 0.05 g/cc and about 0.2 g/cc, between about 0.05 g/cc and about 0.1 g/cc. In some preferred embodiments, the density may be between about 0.06 g/cc and 0.2 g/cc. In some embodiments, the aerogel may exhibit an envelope density outside these ranges.

In some embodiments, the resulting aerogel may exhibit low skeletal density. In some embodiments, the skeletal density may be defined as the ratio of the mass to the skeletal volume occupied by that mass. In some embodiments, the term skeletal density may encompass true density. In some embodiments, the mass may be accurately measured using a digital analytical balance with a precision of 0.001 g. One of ordinary skill in the art would appreciate that skeletal volume of an aerogel refers to solely the solid volume of the aerogel, which may comprise the nanostructures that build up the aerogel backbone (excluding the volume of the pores of the aerogel). In some embodiments, the skeletal volume of specimen may be measured using a pycnometer, for example a Quantachrome Instruments PentaPyc 5200e pycnometer, employing helium as probing gas. In some embodiments, specimens may be dried under a flow of nitrogen or helium prior to measurement to remove adsorbates on the aerogel inner and outer surface, such as entrapped gases, water from the humidity of air, or other solvents. In some embodiments, the skeletal density of specimen may be calculated dividing the mass by the skeletal volume. In some embodiments, aerogel may exhibit a skeletal density between about 1 g/cc and 2 g/cc, between about 1 g/cc and 1.9 g/cc, between about 1 g/cc and 1.8 g/cc, between about 1 g/cc and 1.7 g/cc, between about 1 g/cc and 1.6 g/cc, between about 1 g/cc and 1.5 g/cc, between about 1 g/cc and 1.4 g/cc, between about 1 g/cc and 1.3 g/cc, between about 1 g/cc and 1.2 g/cc, between about 1 g/cc and 1.1 g/cc, between about 1.4 g/cc and 1.9 g/cc, between about 1.5 g/cc and 2 g/cc, between about 1.6 g/cc and 2.1 g/cc, between about 1.7 g/cc and 2.2 g/cc, between about 3 g/cc and 4 g/cc, between about 4 g/cc and 5 g/cc.

In some embodiments, the resulting aerogel may exhibit a high porosity. In some embodiments, the resulting aerogel may exhibit a porosity of at least 50%. In some embodiments, the resulting aerogel may exhibit a porosity greater than about 60%, greater than about 70%, greater than about 80%. In some preferred embodiments, the resulting aerogel may exhibit a porosity of 90% or more. In some embodiments, porosity may be defined as the ratio of the pore volume divided by the envelope volume. In some embodiments, the porosity of the aerogel may be calculated from its envelope density and skeletal density by subtracting the ratio of envelope density divided by skeletal density from 1.

In some embodiments, the resulting aerogel may exhibit a high specific surface area. In some embodiments, the resulting aerogel may exhibit a specific surface area greater than about 50 $m^2/g$, greater than about 100 $m^2/g$, greater than about 200 $m^2/g$, greater than about 300 $m^2/g$, greater than about 400 $m^2/g$, greater than about 500 $m^2/g$, greater than about 600 $m^2/g$, greater than about 700 $m^2/g$, greater than about 800 $m^2/g$, greater than about 900 $m^2/g$, greater than about 1000 $m^2/g$, greater than about 2000 $m^2/g$, greater than about 3000 $m^2/g$, less than about 4000 $m^2/g$. In some preferred embodiments, the specific surface area of the aerogel is between about 400 $m^2/g$ and about 900 $m^2/g$. One of ordinary skill in the art would know how to determine the specific surface area of an aerogel, for example, using nitrogen sorption analysis. For example, nitrogen sorption analysis may be performed using a NOVA®-e Series of surface area and pore size analyzers by Quantachrome Instruments. Before sorption analysis, specimens may be subjected to vacuum of −100 torr and heated for 24 hours to remove moisture and/or other solvents adsorbed by the specimens. In some embodiments, the specific surface area may be calculated from the adsorption isotherm using the Brunauer-Emmett-Teller (BET) method over ranges in relative pressure typically employed in measuring surface area, for example relative pressures ranging from 0.1 to 0.3.

In some embodiments, the resulting aerogel may exhibit a pore size distribution ranging from pore sizes smaller than 0.1 nm to pore sizes larger than 200 nm. In some preferred embodiments, the resulting aerogel may exhibit a pore size distribution mainly covering mesopores (2-50 nm). In some embodiments, the most frequent pore diameter of the aerogel may be in the mesoporous range (2-50 nm). In some embodiments, the most frequent pore diameter of the aerogel may be larger than 1 nm. In some embodiments, the most frequent pore diameter of the aerogel may be larger than 2 nm. In some embodiments, the most frequent pore diameter of the aerogel may be larger than 5 nm. In some embodiments, the most frequent pore diameter of the aerogel may be larger than 10 nm. In some embodiments, the most frequent pore diameter of the aerogel may be larger than 20 nm. In some embodiments, the most frequent pore diameter of the aerogel may be larger than 30 nm. In some embodiments, the most frequent pore diameter of the aerogel may be larger than 40 nm. In some embodiments, the most frequent pore diameter of the aerogel may be larger than 50 nm. In some embodiments, the most frequent pore diameter of the aerogel may be larger than 100 nm. In some preferred embodiments, the most frequent pore diameter of the aerogel is smaller than 50 nm. In some preferred embodiments, the most frequent pore diameter of the aerogel may be about 2-40 nm. One of ordinary skill in the art would know how to determine the pore size distribution of an aerogel, for example, using nitrogen sorption analysis. For example, nitrogen sorption analysis may be performed using a NOVA®-e Series of surface area and pore size analyzers by Quantachrome Instruments. Before sorption analysis, specimens may be subjected to vacuum of −100 torr and heated for 24 hours to remove moisture and/or other solvents adsorbed by the specimens. In some embodiments, the pore size distribution may be calculated from the adsorption or desorption isotherm using the Barrett-Joyner-Halenda (BJH) method. In some embodiments, the most frequent pore diameter may be obtained from the BJH pore size distribution, more specifically the pore diameter corresponding to the peak or maximum of the distribution curve.

In some embodiments, aerogel produced within the scope of the present invention may comprise a high alkoxy to silica molar ratio difficult to achieve using different production approaches. The "alkoxy to silica molar ratio" as described herein refers to the molar ratio of alkoxy groups as defined herein to the silica/silicon in said aerogel.

In some embodiments, the silica aerogel comprises a molar ratio of alkoxy to silica of about 0.05:1. In some embodiments, the silica aerogel comprises a molar ratio of alkoxy to silica of about 0.07:1. In some embodiments, the silica aerogel comprises a molar ratio of alkoxy to silica of about 0.09:1. In some embodiments, the silica aerogel comprises a molar ratio of alkoxy to silica of about 0.12:1. In some embodiments, the silica aerogel comprises a molar ratio of alkoxy to silica of about 0.15:1. In some embodiments, the silica aerogel comprises a molar ratio of alkoxy to silica of about 0.17:1. In some embodiments, the silica aerogel comprises a molar ratio of alkoxy to silica of about 0.2:1. In some embodiments, the silica aerogel comprises a molar ratio of alkoxy to silica of about 0.25:1. In some embodiments, the silica aerogel comprises a molar ratio of alkoxy to silica of about 0.3:1. In some embodiments, the silica aerogel comprises a molar ratio of alkoxy to silica larger than about 0.35:1. In some embodiments, the alkoxy groups and/or other hydrophobic groups on the aerogel network may be identified and quantified via the chemical shifts in $^{1}H$ NMR spectra, $^{13}C$ NMR spectra, and quantitative NMR data of the aerogel specimen. One of ordinary skill in the art would know how to obtain and analyze $^{1}H$ NMR spectra, $^{13}C$ NMR spectra, and quantitative NMR data.

In some embodiments, aerogel may exhibit a certain hydrophobicity. In some embodiments, a surface contact angle may be obtained by placing a water droplet on a flat surface of aerogel. In some embodiments, the contact angle may serve as a measure or quantification of the hydrophobicity. In some embodiments, contact angles may be measured using a goniometer according to the standard BS EN 828:2013. In some embodiments, the water contact angle on the aerogel surface may be greater than 90°. In some embodiments, the water contact angle on the aerogel surface may be greater than 100°. In some embodiments, the water contact angle on the aerogel surface may be greater than 125°. In some embodiments, the water contact angle on the aerogel surface may be greater than 130°. In some embodiments, the water contact angle on the aerogel surface may be greater than 140°. Yet in some other embodiments, the water contact angle on the aerogel surface may be greater than 150°.

In some embodiments, a certain amount of water may be adsorbed by an aerogel sample after a certain time when placed in water or at an environment with high relative humidity. In some embodiments, the water vapor uptake may be measured according to the standard BS EN 12086:2013. In some embodiments, the liquid water uptake may be measured according to the standards BS EN 1609:2013, ASTM C1763-14. In some embodiments, the aerogel exhibits a 24-h water uptake of less than 30%. In some embodiments, the aerogel exhibits a 24-h water uptake of less than 20%. In some embodiments, the aerogel exhibits a 24-h water uptake of less than 15%. Yet in some other embodiments, the aerogel exhibits a 24-h water uptake of less than 10%.

In some embodiments, the thermal conductivity of the silica aerogel may be less than 40 mW/m-K at 25° C. In some embodiments, the thermal conductivity of the silica aerogel may be less than 30 mW/m-K at 25° C. In some preferred embodiments, the thermal conductivity of the silica aerogel is less than 25 mW/m-K at 25° C. Yet in some more preferred embodiments, the thermal conductivity of the silica aerogel is less than 20 mW/m-K at 25° C. In some embodiments, the thermal conductivity is measured according to standards ASTM C518-17, ASTM C177-19.

In the foregoing description and the appended claims, the adduct(s) obtained by reacting silica with the hydroxyl-containing organic molecule(s) are conveniently denoted as silicon alkoxide(s). While this term aids the skilled reader's understanding of the nature of the reaction products, it is also apparent from the present specification that the phrase "silicon alkoxide(s)" (which effectively encompasses blends of alkoxides resulting from the recited reactions) is intended to broadly refer to adducts of silica with any of the herein discussed hydroxyl-containing organic molecule(s), not merely to adducts with alkyl alcohol(s). Hence, for example, adducts with saturated and/or unsaturated alcohols (including saturated and/or unsaturated fatty alcohols), as well as adducts with carboxylic acids (including fatty acids) can be subsumed within the phrase, unless the context makes clear that adducts with alkyl alcohol(s) are specifically called for. Put differently, unless the context prescribes otherwise, the terms silicon alkoxide, silicon adduct or silicon compound may be used interchangeably.

In accordance with these explanations, the invention can also be represented by any of the numbered statements (features) and embodiments of processes, products such as compositions and components, and uses of this invention as set herein below. Each statement and embodiment of the invention so defined may be combined with any other statement and/or embodiment as provided herein unless clearly indicated to the contrary. In particular, any feature indicated as being preferred or advantageous may be combined with any other feature or features or statements indicated as being preferred or advantageous. Hereto, the herein presented invention is also captured by any one or any combination of one or more of the below numbered statements embodiments, with any other statement and/or embodiment as set out herein.

1) A method for manufacturing an aerogel, the method comprising the steps of a) reacting a silica source with one or more hydroxyl-containing organic molecules, thereby forming silicon adducts (to illustrate, if a hydroxyl-containing organic molecule is represented as R—OH, an adduct comprises Si—O— linked to R);

b) hydrolyzing the silicon adducts;

c) forming a silica gel from the hydrolyzed silicon adducts; and d) drying the silica gel to produce an aerogel.

2. The method of statement 1, wherein said silicon adducts each independently contain one or more Si atoms, wherein when two or more Si atoms are present the Si atoms are —O— linked, such as wherein said silicon adducts each independently contain between 1 and 10 (—O— linked) Si atoms, such as 1, 2, 3, 4, 5, 6, 7, 8, 9, or 10 (—O— linked) Si atoms, wherein the —O— linked Si atoms may form linear or branched structures, and wherein said silicon adducts each independently further comprise one or more $R^x$ moieties, wherein each $R^x$ is the same or different and is independently selected from a hydrocarbyl group or a hydrocarbylcarbonyl group. By means of further elucidation, where the oxygen atom of a given Si—O— moiety in an adduct is not linked to another Si atom or to an IV group, it may for example be linked to a hydrogen atom or to a functional group of a polymer as discussed elsewhere in this specification.

3. The method of statement 2, wherein each of $R^x$ is independently selected from the group comprising alkyl, alkenyl, alkylcarbonyl, and alkenylcarbonyl.

4. The method of statement 2 or 3, wherein each of $R^x$ is independently selected from the group comprising $C_1$-$C_{26}$alkyl, $C_2$-$C_{26}$alkenyl, $C_1$-$C_{26}$alkylcarbonyl, and $C_2$-$C_{26}$alkenylcarbonyl.

5. The method of any one of statements 1 to 4, wherein the silica source comprises a material that contains silica, and for instance wherein the silica source comprises silica derived from rice husk, silica sand, silica derived from glass, and/or silica derived from glass fiber.

6. The method of any one of statements 1 to 5, wherein the hydroxyl-containing organic molecule comprises an alcohol, optionally wherein the alcohol is an alkyl alcohol, such as a $C_1$-$C_{18}$ alkyl alcohol, preferably a $C_1$-$C_5$ alkyl alcohol.

7. The method of any one of statements 1 to 6, wherein the hydroxyl-containing organic molecule comprises a carboxylic acid, preferably a fatty acid, and more preferably a fatty acid comprising 13 to 26 carbon atoms, such as from 13 to 20 carbon atoms.

8. The method of any one of statements 1 to 7, wherein the hydroxyl-containing organic molecule comprises an alcohol, and wherein the alcohol is a fatty alcohol.

9. The method of any one of statements 1 to 8, wherein the hydroxyl-containing organic molecule comprises an alcohol selected from the group comprising methanol, ethanol, isopropanol, n-propanol, tert-butanol, sec-butanol, n-butanol, and mixtures thereof, and/or a fatty acid.

10. The method of any one of statements 1 to 9, wherein the silica source is reacted with a mixture comprising i) methanol and/or ethanol and ii) one or more $C_3$-$C_5$ alcohols, such as one or more $C_3$-$C_5$ alcohols selected form the group comprising isopropanol, n-propanol, tert-butanol, sec-butanol, n-butanol, amyl alcohol, iii) optionally a fatty acid, and iv) optionally an organic polymer, preferably a polyol.

11. The method of statement 10, wherein the molar ratio of i) methanol and/or ethanol to ii) one or more $C_3$-$C_5$ alcohols in the mixture is between 1:1 and 4:1, preferably between 2:1 and 3:1.

12. The method of any one of statements 1 to 11, wherein at least a fraction of the silicon adducts obtained in step a) comprises, each independently, at least two different $R^x$ groups, such as wherein at least 50 mol %, at least 60 mol %, at least 70 mol %, at least mol %, or at least 90 mol % of the silicon adducts obtained in step a) comprise, each independently, at least two different IV groups.

13. The method of any one of statements 1 to 12, wherein at least a fraction of the silicon adducts obtained in step a), such as at least 50 mol %, at least 60 mol %, at least 70 mol %, at least 80 mol %, or at least 90 mol % of the silicon adducts obtained in step a), comprise i) a methoxy group and/or an ethoxy group and ii) one or more $C_3$-$C_5$ alkoxy groups, such as one or more $C_3$-$C_5$ alkoxy groups selected from the group comprising isopropoxy group, n-propoxy group, tert-butoxy group, sec-butoxy group, n-butoxy group, amyloxy group, and iii) optionally a fatty acid ester group.

14. The method of any one of statements 1 to 13, wherein at least a fraction of the silicon adducts obtained in step a), such as at least 50 mol %, at least 60 mol %, at least 70 mol %, at least 80 mol %, or at least 90 mol % of the silicon adducts obtained in step a), comprise a methoxy group and an isopropoxy group.

15. The method of any one of statements 1 to 14, wherein drying is performed at ambient pressure.

16. The method of any one of statements 1 to 15, wherein drying is performed in the presence of microwave radiation.

17. The method of any one of statements 1 to 16, wherein drying is performed by supercritically extracting the pore fluid from the silica gel.

18. The method of any one of statements 1 to 17, wherein the aerogel comprises an —O—$R^x$ group on its surface.

19. The method of any one of statements 1 to 18, wherein the aerogel comprises an isopropoxy group on its surface.

20. The method of any one of statements 1 to 19, wherein the aerogel comprises a methoxy group on its surface.

21. The method of any one of statements 1 to 20, wherein the aerogel exhibits a surface contact angle of greater than 100°.

22. The method of any one of statements 1 to 21, wherein the aerogel exhibits a 24-h water uptake of less than 15%.

23. The method of any one of statements 1 to 22, wherein a hydrophobic group is attached to the silica gel with the assistance of microwave radiation.

24. The method of any one of statements 1 to 23, wherein a hydrophobic group is attached to the silica gel at supercritical conditions.

25. The method of any one of statements 1 to 24, wherein formation of the silicon adduct is performed in the presence of desiccant and/or a water scavenger.

26. The method of any one of statements 1 to 25, wherein formation of the silicon adduct is performed in the presence of a base, optionally wherein the base is selected from the group comprising an alkali metal hydroxide, ammonia, ammonium hydroxide, a primary amine, a secondary amine, a tertiary, a quaternary amine, an ammonium salt, and mixtures thereof 27. The method of statement 26, wherein hydrolysis of the silicon adduct and/or formation of the silica gel is catalyzed by the base used to catalyze formation of the silicon adduct.

28. The method of any one of statements 1 to 27 further comprising the step of recovering a hydroxyl-containing organic molecule resulting from hydrolysis of the silicon adduct and/or from formation of the silica gel; and using the recovered hydroxyl-containing organic molecule to make another silicon adduct.

29. A method for manufacturing a silica aerogel, the method comprising the steps of
   a) reacting a silica source with one or more hydroxyl-containing organic molecules, thereby forming silicon adducts;
   b) hydrolyzing the silicon adducts;
   c) forming a silica gel from the hydrolyzed silicon adducts; and
   d) drying the silica gel to produce a silica aerogel.

wherein the method further comprises recovering a hydroxyl-containing organic molecule resulting from hydrolysis of the silicon adducts and/or from formation of the silica gel; and using the recovered hydroxyl-containing organic molecule to make another silicon adduct.

30. The method of statement 29 wherein said silicon adducts may be as defined according to any of statements 2 to 4.

31. The method of any one of statements 29 or 30, wherein the hydroxyl-containing organic molecule comprises an alcohol selected from the group comprising methanol, ethanol, isopropanol, n-propanol, tert-butanol, sec-butanol, n-butanol, and mixtures thereof, and/or a fatty acid.

32. The method of any one of statements 29 to 31, wherein recovery of the hydroxyl-containing organic molecule is performed in the presence of a desiccant and/or water scavenger.

33. The method of any one of statements 29 to 32, wherein at least a fraction of the silicon adducts obtained in step a) comprises, each independently, at least two different $R^x$ groups, such as wherein at least 50 mol %, at least 60 mol %, at least 70 mol %, at least mol %, or at least 90 mol % of the silicon adducts obtained in step a) comprise, each independently, at least two different $R^x$ groups.

34. The method of any one of statements 29 to 33, wherein the drying process is performed at ambient pressure.

35. A silica aerogel comprising one or more hydrophobic side groups, the hydrophobic side groups comprising at least one —O—$R^x$ group, wherein $R^x$ is according to any one of statements 2 to 4, and preferably the hydrophobic side groups comprise at least one alkoxy group and/or a fatty acid ester group.

36. The silica aerogel of statement 35, wherein the thermal conductivity of the silica aerogel is less than 25 mW/m-K at 25° C. As used herein, the term "hydrocarbyl" or "hydrocarbyl having 1 to 30 carbon atoms" refers to a moiety selected from the group comprising a linear or branched $C_1$-$C_{30}$ alkyl and $C_2$-$C_{30}$ alkenyl, or any combinations thereof. Exemplary hydrocarbyl groups are for instance methyl, ethyl, propyl, butyl, amyl, isoamyl, hexyl, isobutyl, heptyl, octyl, nonyl, decyl, cetyl, and 2-ethylhexyl.

The term "carbonyl" as used herein means carbon atom bonded to oxygen with a double bond, i.e., C═O.

The term "hydrocarbylcarbonyl or "hydrocarbylcarbonyl having 2 to 31 carbon atoms" refers to a group having the formula —C(O)—$R^y$ wherein $R^y$ is hydrocarbyl as defined herein above.

The following examples are intended to illustrate certain embodiments of the present invention.

EXAMPLES

Example 1

Rice hull ash was prepared by leaching grinded rice hulls in a 1-2 M sulfuric acid solution for 4-6 hours at an elevated temperature of about 50-100° C. obtained via microwave radiation. The acid-leached rice hulls were then thoroughly rinsed with distilled water to remove the acid and impurities before being dried and converted to rice hull ash by combustion at 500° C. for 4-6 hours. 40 g of as-obtained rice hull ash (containing about 30-38 g of silica) was added to a mixture consisting of 80-160 g of methanol, 60-100 g of isopropyl alcohol, 40-60 g of stearic acid, 3.3 g of potassium hydroxide, 5-25 g of potassium oxide, and 140 g of acetone dimethyl acetal (2,2-dimethoxypropane) in a stainless steel autoclave of 1 L inner volume containing a magnetic stirrer stirring at 400 rpm. The autoclave was then sealed and heated up to a temperature in the range 180-260° C. by application of a microwave field and pressurized to about 1-2 MPa while being stirred at 400-800 rpm for 6-24 hours. Methanol, isopropyl alcohol, and stearic acid reacted with the silicon oxides of the rice hull ash to form silicon alkoxides. The reaction was catalyzed by potassium hydroxide. Potassium oxide and acetone dimethyl acetal were used as dehydrating agents. After hydration, potassium oxide was converted into potassium hydroxide; acetone dimethyl acetal was converted into methanol and acetone. A silicon alkoxide blend in alcohol and acetone was then obtained, in which at least 90 mol % of the formed alkoxides contained no more than three silicon atoms. Greater than 90 mol % of the silicon alkoxides contained 2 different alkoxy groups, in this case methoxy groups and isopropoxy groups. Greater than 10 mol % of the silicon alkoxides contained 3 different alkoxy groups, in this case methoxy groups, isopropoxy groups, and the alkoxy groups of stearic acid. The autoclave was then cooled and kept to a temperature of 50-60° C. before the addition via injection of 18-50 g of water to the silicon alkoxide blend formed inside while being stirred at 200-700 rpm for 1-15 minutes after which the stirring was stopped. The application of microwaves continued in order to keep the reaction medium, now a sol-gel material, at a temperature of 50-60° C. to induce complete gelation, aging, and hydrophobization, for 6-24 hours. The liquid phase of the system was then extracted at ambient pressure and a temperature of 150-170° C. for 3 hours by application of a microwave field. Alcohol and acetone that were removed from the system during the aerogel production process were collected (vapors were condensed back to liquid phase) and used to produce new alkoxides and sols. The resulting aerogels came in the form of monoliths, chunks, and/or particles, and were pulverized into smaller particles (1-10 mm). The aerogels had an envelope density of about 100-150 kg/$m^3$, a porosity larger than 90%, a BET specific surface are of about 500-700 $m^2$/g, a 24-h water uptake of less than 10%, a surface contact angle of greater than 110°, and a thermal conductivity of about 18-35 mW/m-K. The aerogel had methoxy groups, isopropoxy groups, and alkoxy groups of stearic acid on its backbone.

Example 1-A 32 g of precipitated silica was added to a mixture consisting of 100 g of methanol, 60 g of isopropyl alcohol, 40 g of stearic acid, 3.3 g of potassium hydroxide, 5 g of potassium oxide, and 140 g of acetone dimethyl acetal (2,2-dimethoxypropane) in a stainless steel autoclave of 1 L inner volume containing a magnetic stirrer stirring at 600 rpm. The autoclave was then sealed and charged with carbon dioxide to obtain an internal pressure of 2 MPa. Then, the autoclave was heated up to a temperature of 260° C. while stirring continued at 600 rpm for 24 hours. Methanol, isopropyl alcohol, and stearic acid reacted with the silicon oxides of the precipitated silica to form silicon alkoxides. The reactions were catalyzed by potassium hydroxide and carbon dioxide. Potassium oxide and acetone dimethyl acetal were used as dehydrating agents. After hydration, potassium oxide was converted into potassium hydroxide; acetone dimethyl acetal was converted into methanol and acetone. A silicon alkoxide blend in alcohol and acetone was then obtained. After the autoclave was cooled and kept at a temperature of 50° C., remaining carbon dioxide was slowly released by opening a needle-valve before the addition via injection of 40 g of water via spray nozzles to the silicon alkoxide blend formed inside while being stirred at 600 rpm for 15 minutes after which the stirring was stopped. Heating continued in order to keep the reaction medium, now a sol-gel material, at a temperature of 50-60° C. to induce complete gelation and aging for 24 hours. The resulting gel was then pulverized into small gel particles (1-10 mm) and then solvent exchanged in pentane. The liquid phase of the gel particles was then extracted at ambient pressure and a temperature of 60° C. for 20 minutes followed by second drying step at 170° C. for 30 minutes by application of a microwave field. Alcohol, acetone, and pentane that were removed from the system during the aerogel production process were collected (vapors were condensed back to liquid phase) and used to produce new alkoxides, sols, and gels. The aerogel particles had an envelope density of about 120-150 kg/$m^3$, a porosity larger than 50%, a BET specific surface area of about 450 $m^2$/g, a 24-h water uptake of less than 10%, a surface contact angle of greater than 100°, and a thermal conductivity of about 29 mW/m-K. The aerogel had methoxy groups, isopropoxy groups, and alkoxy groups of stearic acid on its backbone.

Example 2

40 g of silica sand with an average particle size of 100 μm was mixed with 30 g potassium carbonate in a crucible and brought in an electrical furnace set to 1300° C. The silica sand mixed with potassium carbonate was kept at 1300° C. for 2 hours. After cooling to room temperature, the obtained glass cullet was broken into small pieces and crushed to an average particle size of about 1-3 mm. 32 g of crushed glass cullet was added to a mixture of 100 g of methanol, 60 g of tert-butanol, 3 g of potassium hydroxide, and 140 g of trimethoxymethane in a stainless steel autoclave of 1 L inner volume containing a magnetic stirrer stirring at 400 rpm. The autoclave was then sealed and charged with carbon dioxide to obtain an internal pressure of 2.5 MPa. Then, the autoclave was heated up to a temperature of 260° C. while stirring continued at 800 rpm for 24 hours. Methanol and tert-butanol reacted with the silicon oxides of the glass cullet to form silicon alkoxides. Trimethoxymethane was used as water scavenger. After the autoclave was cooled and kept at a temperature of 50° C., remaining carbon dioxide was slowly released by opening a needle-valve before the addition via injection of 40 g of water via spray nozzles to the silicon alkoxide blend formed inside while being stirred at 600 rpm for 15 minutes after which the stirring was stopped. Heating continued in order to keep the reaction medium, now a sol-gel material, at a temperature of 50-60° C. to induce complete gelation and aging for 24 hours. The resulting gel was then pulverized into small gel particles (1-10 mm) and then solvent exchanged in pentane. The liquid phase of the gel particles was then extracted at ambient pressure and a temperature of 60° C. for 20 minutes followed by a second drying step at 170° C. for 30 minutes by application of a microwave field. The aerogel particles had an envelope density of about 120-150 kg/$m^3$, a porosity larger than 50%, a BET specific surface area of about 380 $m^2$/g, a 24-h water uptake of less than 25%, a surface contact angle of greater than 100°, and a thermal conductivity of about 35 mW/m-K. The aerogel had methoxy groups and tert-butoxy groups on its backbone.

Example 3

32 g of fumed silica added to a mixture of 80 g of methanol, 80 g of isopropyl alcohol, 3 g of potassium hydroxide, and 140 g of dimethoxypropane in a stainless steel autoclave of 1 L inner volume containing a magnetic stirrer stirring at 400 rpm. The autoclave was then sealed and charged with carbon dioxide to obtain an internal pressure of 2.5 MPa. Then, the autoclave was heated up to a temperature of 270° C. while being stirred at 800 rpm for 24 hours. Methanol and isopropyl alcohol reacted with the silicon oxides of the glass cullet to form silicon alkoxides. Dimethoxypropane was used as water scavenger. After the autoclave was cooled and kept to a temperature of 50° C., remaining carbon dioxide was slowly released by opening a needle-valve before the addition 36 g of water via spray nozzles to the silicon alkoxide blend formed inside while being stirred at 600 rpm for 15 minutes after which the stirring was stopped. Heating continued in order to keep the reaction medium, now a sol-gel material, at a temperature of 50-60° C. to induce complete gelation and aging for 24 hours. The resulting gel was then pulverized into small gel particles (1-10 mm) and then washed in fresh isopropyl alcohol. The washed gel particles were then loaded again in the autoclave to which additional isopropyl alcohol was added until about two third of the inner volume of the autoclave was filled. The autoclave was then sealed, heated up to 270° C. and a pressure above 90 bar. After 30 minutes, the pressure was slowly lowered to atmospheric pressure at a rate of about 20 bar per hour while keeping a constant temperature of about 270° C. As such, the liquid phase of the gel particles was then extracted via supercritical extraction. Then the autoclave was cooled to ambient temperature and opened. The as-obtained aerogel particles were then dried in a ventilated oven at 170° C. for 1 hour to remove any residual traces of pore fluid. The aerogel particles had an envelope density of about 100-120 kg/$m^3$, a porosity larger than 50%, a BET specific surface area of about 610 $m^2$/g, a 24-h water uptake of less than 5%, a surface contact angle of greater than 120°, and a thermal conductivity of about 23 mW/m-K. The aerogel had methoxy groups and tert-butoxy groups on its backbone.

Example 4

40 g of silica sand with an average particle size of 100 μm was mixed with 30 g of potassium carbonate in a crucible and brought in an electrical furnace set to 1300° C. The silica sand mixed with potassium hydroxide was kept at 1200° C. for 3 hours. After cooling to room temperature, the obtained glass cullet was broken into small pieces and crushed to an average particle size of about 1-3 mm. 32 g of crushed glass cullet was added to a mixture of 100 g of methanol, 60 g of isobutanol, 3 g of potassium hydroxide, and 140 g of trimethoxymethane in a stainless steel autoclave of 1 L inner volume containing a magnetic stirrer stirring at 400 rpm. The autoclave was then sealed and charged with carbon dioxide to obtain an internal pressure of 2.5 MPa. Then, the autoclave was heated up to a temperature of 260° C. while being stirred at 800 rpm for 24 hours. Methanol and isobutanol reacted with the silicon oxides of the glass cullet to form silicon alkoxides. Trimethoxymethane was used as water scavenger. Then, the autoclave was cooled to ambient temperature and remaining carbon dioxide was slowly released by opening a needle-valve. The alkoxide blend obtained in the autoclave was then heated to 90° C. to remove excess of liquid until the mass lowered to about 140-150 g. To this alkoxide blend a solution of 63 g of methanol and 40 g of water was added under stirring at 600 rpm. After stirring at 600 rpm for 15 minutes, the stirring was stopped and the sol was poured into a mold and sealed for 24 hours. The resulting gel was then pulverized into small gel particles (1-10 mm) and then solvent exchanged in pentane. The liquid phase of the gel particles was then extracted at ambient pressure and a temperature of 60° C. for 20 minutes followed by second drying step at 170° C. for 30 minutes by application of a microwave field. The aerogel particles had an envelope density of about 130-150 kg/$m^3$, a porosity larger than 50%, a BET specific surface area of about 355 $m^2$/g, a 24-h water uptake of less than 25%, a surface contact angle of greater than 100°, and a thermal conductivity of about 32 mW/m-K. The aerogel had methoxy groups and isobutoxy groups on its backbone.

Example 5

32 g of precipitated silica was added to a mixture of 120 g of methanol, 40 g of isopropyl alcohol, 2 g of potassium hydroxide, 8 g of pentylamine (1-aminopentane) and 140 g of trimethoxymethane in a stainless steel autoclave of 1 L inner volume containing a magnetic stirrer stirring at 400 rpm. The autoclave was then sealed and charged with carbon dioxide to obtain an internal pressure of 3 MPa. Then, the autoclave was heated up to a temperature of 260° C. while being stirred at 800 rpm for 24 hours. Methanol and isopropyl alcohol reacted with the silicon oxides of the precipitated silica to form silicon alkoxides. Potassium hydroxide and pentyl amine catalyzed the formation of the silicon alkoxides. Methanol and isopropyl alcohol reacted with carbon dioxide to form alkyl carbonates (mostly dimethyl carbonate). The alkyl carbonates coupled pentylamine with the silicon oxides. Trimethoxymethane was used as water scavenger. Then, the autoclave was cooled and kept at a temperature of 50° C., remaining carbon dioxide was slowly released by opening a needle-valve. Then, 36 g of water was added via spray nozzles to the silicon alkoxide blend formed inside while being stirred at 600 rpm for 15 minutes after which the stirring was stopped. Heating continued in order to keep the reaction medium, now a sol-gel material, at a temperature of 50-60° C. to induce complete gelation and aging for 24 hours. The gel was then solvent exchanged with liquid carbon dioxide in the autoclave over the course of two days. After filling up the autoclave for at least half of its inner volume with liquid carbon dioxide, the autoclave was sealed off and heated to 50° C. and pressurized to 100 bar. After 30 minutes, the pressure was slowly lowered to atmospheric pressure at a rate of about 20 bar per hour while keeping a constant temperature of about 50° C. As such, the liquid phase of the gel particles (mostly carbon dioxide) was then extracted via supercritical extraction. Then the autoclave was cooled to ambient temperature and opened. The aerogel came in the form of monoliths, chunks, and particles. The aerogel had an envelope density of about 90-110 kg/m', a porosity larger than 50%, a BET specific surface area of about 680 $m^2$/g, a 24-h water uptake of less than 15%, a surface contact angle of greater than 100°, and a thermal conductivity of about 22 mW/m-K.

Example 6

Rice hull ash was prepared by leaching grinded rice hulls in a 2 M sulfuric acid solution for 6 hours at an elevated temperature of about 90° C. obtained via microwave radiation. The acid-leached rice hulls were then thoroughly rinsed with distilled water to remove the acid and impurities before being dried and converted to rice hull ash by combustion at 500° C. for 6 hours. 40 g of as-obtained rice hull ash contained about 36 g of silica and was added to a mixture consisting of 80 g of methanol, 256 g of isopropyl alcohol, 16 g of potassium carbonate, and 48 g of urea in a stainless steel autoclave of 1 L inner volume containing a magnetic stirrer stirring at 400 rpm. The autoclave was then sealed and charged with carbon dioxide to obtain an internal pressure of 0.5 MPa. Then, the autoclave was heated up to a temperature of 260° C. while being stirred at 800 rpm for 24 hours. Methanol and isopropyl alcohol reacted with the silicon oxides of the rice hull ash to form silicon alkoxides. The reactions were catalyzed by potassium carbonate and urea. Then, the autoclave was cooled and kept at a temperature of 50° C. while remaining carbon dioxide was slowly released by opening a needle-valve. Then, 40 g of water was added via spray nozzles to the silicon alkoxide blend in the autoclave while being stirred at 600 rpm for 15 minutes after which the stirring was stopped. Heating continued in order to keep the reaction medium, now a sol-gel material, at a temperature of 50-60° C. to induce complete gelation and aging for 24 hours. The resulting gel was then pulverized into small gel particles (1-10 mm) and then solvent exchanged in pentane. The liquid phase of the gel particles was then extracted at ambient pressure and a temperature of 60° C. for 20 minutes followed by second drying step at 170° C. for 30 minutes by application of a microwave field. The aerogel particles had an envelope density of about 140-160 kg/$m^3$, a porosity larger than 50%, a BET specific surface area of about 260 $m^2$/g, a 24-h water uptake of less than 25%, a surface contact angle of greater than 100°, and a thermal conductivity of about 37 mW/m-K.

Example 7

Sugarcane bagasse ash was prepared by leaching grinded sugarcane bagasse in a 1-2 M sulfuric acid solution for 4-6 hours at an elevated temperature of about 50-100° C. obtained via microwave radiation. Ultrasonic frequencies were applied for 1 hour using an ultrasonic probe to improve the extraction of silicon oxides from the sugarcane bagasse. The acid-leached sugarcane bagasse was then thoroughly rinsed and filtered with distilled water to remove the acid and impurities before being dried and converted to sugarcane bagasse ash by combustion at 500-600° C. for 4-6 hours. A mixture of 100-180 g of methanol and 80-120 g of isopropyl alcohol was prepared in a continuous stirred tank reactor of 1 L at a stirring rate of about 400-800 rpm and a temperature in the range 180-260° C. by application of a microwave field. The mixture of methanol and isopropyl alcohol was then fed into another continuous stirred tank reactor of 1 L containing 40 g of sugarcane bagasse ash (containing about 30-38 g of silica), 3.3 g of potassium hydroxide, g of potassium oxide, and 140 g of acetone dimethyl acetal (2,2-dimethoxypropane) stirring at a rate of about 400-800 rpm, heated up to a temperature in the range 180-260° C. by application of a microwave field, and pressurized to about 1-2 MPa for 6-24 hours. Methanol and isopropyl alcohol reacted with the silicon oxides of the sugarcane bagasse ash to form silicon alkoxides. The reaction was catalyzed by potassium hydroxide. Potassium oxide and acetone dimethyl acetal were used as dehydrating agents. After hydration, potassium oxide was converted into potassium hydroxide; acetone dimethyl acetal was converted into methanol and acetone. A silicon alkoxide blend in alcohol and acetone was then obtained, in which at least 90% of the formed alkoxides contained no more than three silicon atoms. Greater than 90 mol % of the silicon alkoxides contained 2 different alkoxy groups, in this case methoxy groups and isopropoxy groups. The silica concentration (mass percentage) of the silicon alkoxide blend in alcohol and acetone was then adjusted to 6-10 wt % while being transferred into a third continuous stirred tank reactor of 1 L stirring at about 200 to 500 rpm. 40-60 g of oleic acid was added to the mixture under stirring. A sol was then formed after the addition of 20-50 g of water to the reaction mixture to start hydrolysis (base catalyzed) of the silicon oxides under stirring. Stirring was stopped after 5-15 min after the addition of water. The sol was brought to a temperature in the range from about 50° C. to 70° C., via microwave radiation. The sol turned into a gel after about 20-40 minutes. Some of the hydrophobic alkoxy groups of the alcohols and oleic acid got attached to the silica network during and after formation of this network. The application of microwaves continued in order to keep the reaction medium, a gel material, at a temperature of 50-70° C. to induce complete gelation, aging, and hydrophobization. The whole sol-gel process lasted for 6-24 hours. The resulting gels were taken out the reactor and came in the form of monoliths, chunks, and/or particles, and were pulverized into smaller particles (1-10 mm) before drying in a ventilated oven. The gel particles were first dried at ambient pressure at room temperature for 4 hours. The drying temperature was then set to 50° C. and kept at this temperature for 2 hours, followed by a final drying step a at temperature of 160° C. for 2 hours to promote the spring-back effect, all at ambient pressure. Alcohol and acetone that were removed from the system during the production process were collected (vapors were condensed back to liquid phase) and used to produce new alkoxides and sols. A net envelope volume shrinkage less than 20% was measured for the obtained aerogels. The aerogels had an envelope density of about 100-150 kg/m$^3$, a porosity larger than 90%, a BET specific surface are of about 500-700 m$^2$/g, a 24-h water uptake of less than 10%, a surface contact angle of greater than 110°, and a thermal conductivity of about 18-35 mW/m-K. The aerogel had methoxy groups, isopropoxy groups, and alkoxy groups of oleic acid on its backbone.

Example 7-A

Sugarcane bagasse ash was prepared by leaching grinded sugarcane bagasse in a 2 M sulfuric acid solution for 6 hours at an elevated temperature of about 90° C. obtained via microwave radiation. Ultrasonic frequencies were applied for 1 hour using an ultrasonic probe to improve the extraction of silicon oxides from the sugarcane bagasse. The acid-leached sugarcane bagasse was then thoroughly rinsed and filtered with distilled water to remove the acid and impurities before being dried and converted to sugarcane bagasse ash by combustion at 550° C. for 6 hours. A mixture of 120 g of methanol and 80 g of isopropyl alcohol was prepared in a continuous stirred tank reactor of 1 L at a stirring rate of about 600 rpm and a temperature of 250° C. The mixture of methanol and isopropyl alcohol was then charged with carbon dioxide to a pressure of 2 MPa. The mixture was then fed into another continuous stirred tank reactor of 1 L containing 40 g of sugarcane bagasse ash (containing about 37 g of silica), 3.3 g of potassium hydroxide, 15 g of potassium oxide, and 140 g of acetone dimethyl acetal (2,2-dimethoxypropane) stirring at a rate of 600 rpm, heated up to a temperature in the range 250° C. and kept at these conditions for 24 hours. Methanol and isopropyl alcohol reacted with the silicon oxides of the sugarcane bagasse ash to form silicon alkoxides. The reaction was catalyzed by potassium hydroxide. Potassium oxide and acetone dimethyl acetal were used as dehydrating agents. After hydration, potassium oxide was converted into potassium hydroxide; acetone dimethyl acetal was converted into methanol and acetone. A silicon alkoxide blend in alcohol and acetone was then obtained. The silica concentration (mass percentage) of the silicon alkoxide blend in alcohol and acetone was then adjusted to 8 wt % while being transferred into a third continuous stirred tank reactor of 1 L stirring at 500 rpm. 40 g of oleic acid was added to the mixture under stirring. A sol was then formed after the addition of 40 g of water to the reaction mixture to start hydrolysis (base catalyzed) of the silicon oxides under stirring. Stirring was stopped after 15 min after the addition of water. The sol was brought to a temperature of about 50° C. via microwave radiation. The sol turned into a gel after about 40-60 minutes. Some of the hydrophobic alkoxy groups of the alcohols and oleic acid got attached to the silica network during and after formation of this network. The application of microwaves continued in order to keep the reaction medium, a gel material, at a temperature of 50-70° C. to induce complete gelation, aging, and hydrophobization. The resulting gels were taken out the reactor and came in the form of monoliths, chunks, and/or particles, and were pulverized into smaller particles (1-10 mm) before drying in a ventilated oven. The gel particles were first dried at ambient pressure at room temperature for 4 hours. The drying temperature was then set to 50° C. and kept at this temperature for 2 hours, followed by a final drying step a at temperature of 160° C. for 2 hours to promote the spring-back effect, all at ambient pressure. Alcohol and acetone that were removed from the system during the production process were collected (vapors were condensed back to liquid phase) and used to produce new alkoxides and sols. A net envelope volume shrinkage less than 40% was measured for the obtained aerogels. The aerogels had an envelope density of about 130-150 kg/m$^3$, a porosity larger than 50%, a BET specific surface are of about 340 m$^2$/g, a 24-h water uptake of less than 20%, a surface contact angle of greater than 110°, and a thermal conductivity of about 35 mW/m-K. The aerogel had methoxy groups, isopropoxy groups, and alkoxy groups of oleic acid on its backbone.

Example 8

Rice hull ash was prepared by the same process as that described in Example 1, with the exception of the use of a 4-5 M oxalic acid solution instead of the 1-2 M sulfuric acid solution. A plug flow reactor was fed in advance with 40 g of the rice hull ash (containing about 30-38 g of silica), 3.5-4.5 g of potassium carbonate, and 5-25 g of potassium oxide. The reactor was then gradually and continuously fed with a mixture of 100-180 g of methanol, 80-120 g of isopropyl alcohol, and 140 g of acetone dimethyl acetal (2,2-dimethoxypropane) in liquid or vapor form, accompanied with a carbon dioxide stream as a carrier gas at a charging pressure of 1-3 MPa. The reaction temperature and pressure were about 100-300° C. and 1-3 MPa, respectively. The heat was provided via microwave radiation. The mixture of methanol, isopropyl alcohol, and acetone dimethyl acetal (2,2-dimethoxypropane) was recirculated to enhance the reaction with the silicon oxides. The total reaction time was varied from 2 to 12 hours. A continuous stream of a silicon alkoxide blend in alcohol and acetone was obtained, in which at least 90 mol % of the formed alkoxides contained no more than three silicon atoms. Greater than 80 mol % of the silicon alkoxides contained 2 different alkoxy groups, in this case methoxy groups and isopropoxy groups. A sol was then continuously formed after the continuous addition of water to the silicon alkoxide blend (molar ratio water/silicon of 4-10) in alcohol and acetone to start hydrolysis (base catalyzed) of the silicon oxides. The silica concentration (mass percentage) of the sol was adjusted to 6-10 wt % before being sprayed as droplets into or onto a flowing medium such as a bath to obtain discrete gel particles or granules. A spray of sol droplets was obtained by injecting the sol through a dispensing nozzle. Sol droplets would be converted into gel particles of about 1 to 5 mm in about 1-15 min and were transported on a conveyer belt in a bath of ethanol and operating at a temperature of with the assistance of microwave radiation for 15-30 min. Gel particles were then collected on a dry conveyer belt and dried at ambient pressure at a temperature of 160° C. with the assistance of microwave radiation for 15-30 min. Alcohol and acetone that were removed from the system during the production process were collected (vapors were condensed back to liquid phase) and used to produce new alkoxides and sols. A net envelope volume shrinkage less than 20% was measured for the obtained aerogels. The aerogels had an envelope density of about 100-150 kg/m$^3$, a porosity larger than 90%, a BET specific surface are of about 500-700 m$^2$/g, a 24-h water uptake of less than 10%, a surface contact angle of greater than 110°, and a thermal conductivity of about 18-35 mW/m-K.

Example 8-A

Rice hull ash was prepared by the same process as that described in Example 6, with the exception of the use of a 5 M oxalic acid solution instead of the 2 M sulfuric acid solution. 40 g of the rice hull ash contained about 35 g of silica and was added to a mixture of 3.5 g of potassium carbonate, 10 g of potassium oxide, 120 g of methanol, 80 g of isopropyl alcohol, and 140 g of acetone dimethyl acetal (2,2-dimethoxypropane) in a stainless steel autoclave of 1 L inner volume containing a magnetic stirrer stirring at 600 rpm. The autoclave was sealed and charged with carbon dioxide to a pressure of 2.5 MPa. The autoclave was then heated to 260° C. and kept at this temperature for 48 hours. The methanol and isopropyl alcohol reacted with the silicon oxides of the rice hull ash to form silicon alkoxides. After the autoclave was cooled and kept at a temperature of 50° C., remaining carbon dioxide was slowly released by opening a needle-valve before the addition via injection of 40 g of water via spray nozzles to the silicon alkoxide blend formed inside while being stirred at 600 rpm for 15 minutes after which the stirring was stopped. Heating continued in order to keep the reaction medium, now a sol-gel material, at a temperature of 50-60° C. to induce complete gelation and aging for 24 hours. The resulting gel was then pulverized into small gel particles (1-10 mm) and then solvent exchanged in pentane. The liquid phase of the gel particles was then extracted at ambient pressure and a temperature of 60° C. for 20 minutes followed by second drying step at 170° C. for 30 minutes by application of a microwave field. A net envelope volume shrinkage less than 30% was measured for the obtained aerogels. The aerogels had an envelope density of about 130-150 kg/m$^3$, a porosity larger than 50%, a BET specific surface are of about 290 m$^2$/g, a 24-h water uptake of less than 30%, a surface contact angle of greater than 100°, and a thermal conductivity of about 36 mW/m-K.

Example 9

Silica sand was used as silica source to produce the silicon alkoxide blend. First, silica sand particles were broken down with the help of a jaw crusher to an average particle size of 5-50 μm. 40 g of silica sand was then added to a mixture consisting of 100-180 g of methanol, 80-120 g of isopropyl alcohol, 3 g of cesium hydroxide, 5-25 g of propylene oxide (proton scavenger), and 140 g of acetone dimethyl acetal (2,2-dimethoxypropane) in a stainless steel autoclave of 1 L inner volume containing a magnetic stirrer stirring at 400 rpm. The autoclave was then sealed, heated up to a temperature in the range of 200-260° C. by application of a microwave field, charged with carbon dioxide and pressurized to about 2-4 MPa while being stirred at 400-800 rpm for 72 hours. Methanol and isopropyl alcohol reacted with silica to form silicon alkoxides. About 70 wt % of the silica was converted into silicon alkoxides. A silicon alkoxide blend in alcohol and acetone was then obtained, in which at least 90 mol % of the formed alkoxides contained no more than three silicon atoms. Greater than 80 mol % of the silicon alkoxides contained 2 different alkoxy groups, in this case methoxy groups and isopropoxy groups. The silica concentration (mass percentage) of the silicon alkoxide blend in alcohol and acetone was then adjusted to 6-10 wt % while being transferred into another continuous stirred tank reactor of 1 L stirring at about 200 to 500 rpm. Unreacted silica remained in the first reactor (autoclave). A sol was then produced and further processed to aerogel following the same procedure as described in Example 7. A net envelope volume shrinkage greater than 20% but less than 50% was measured for the obtained aerogels. The aerogels had an envelope density of about 130-170 kg/m$^3$, a porosity larger than 80%, a BET specific surface are of about 400-600 m$^2$/g, a 24-h water uptake of less than 15%, a surface contact angle of greater than 100°, and a thermal conductivity of about 25-35 mW/m-K.

Example 10

A sol was prepared according to the procedure described in Example 7. The same volume of sol was then evenly sprayed via a mobile dispensing nozzle on a 25 cm×25 cm×1 cm (length×width×thickness) blanket fabricated of glass fibers. The blanket impregnated with the sol was heated to a temperature of 40-70° C. by application of a microwave field for 5 hours in order for a complete gelation, aging, and hydrophobization, while occasional sprinkling of ethanol prevented the gel blanket from drying out. The blanket was then dried at ambient pressure at a temperature of 80° C. for 2 hours followed by a drying at 160° C. for 2 hours by application of a microwave field. An aerogel blanket having a 24-h water uptake of less than 10%, a surface contact angle of greater than 110°, and a thermal conductivity of about 20-30 mW/m-K was obtained.

Example 10-A

A sol was prepared according to the procedure described in Example 1-A. A 25 cm×25 cm×1 cm (length×width×thickness) fiber batting fabricated of glass fibers was immersed in a bath containing the sol for 30 minutes. The blanket impregnated with the sol was then heated to a temperature of 60° C. by application of a microwave field for 15 minutes in order for a complete gelation, aging, and hydrophobization, while occasional sprinkling of ethanol prevented the gel blanket from drying out. The blanket was then dried at ambient pressure at a temperature of 90° C. for 20 minutes followed by a drying at 160° C. for 20 minutes by application of a microwave field. An aerogel blanket having a 24-h water uptake of less than 30%, a surface contact angle of greater than 110°, and a thermal conductivity of about 33 mW/m-K was obtained.

Example 11

Aerogels were produced according to the same procedure described in Example 1 with the exception of the composition of reaction mixture to produce the silicon alkoxide blend. Ethanol and tert-butanol were used instead of methanol and isopropyl alcohol, respectively. A net envelope volume shrinkage less than 20% was measured for the obtained aerogels. The aerogels had an envelope density of about 100-150 kg/$m^3$, a porosity larger than 90%, a BET specific surface are of about 500-700 $m^2$/g, a 24-h water uptake of less than 10%, a surface contact angle of greater than 110°, and a thermal conductivity of about 18-35 mW/m-K. The aerogel had ethoxy groups, tert-butoxy groups, and alkoxy groups of stearic acid on its backbone.

Example 11-A

Aerogels were produced according to the same procedure described in Example 1-A with the exception of the composition of reaction mixture to produce the silicon alkoxide blend. Ethanol and tert-butanol were used instead of methanol and isopropyl alcohol, respectively. A net envelope volume shrinkage less than 40% was measured for the obtained aerogels. The aerogels had an envelope density of about 110-140 kg/$m^3$, a porosity larger than 50%, a BET specific surface are of about 380 $m^2$/g, a 24-h water uptake of less than 20%, a surface contact angle of greater than 100°, and a thermal conductivity of about 34 mW/m-K. The aerogel had ethoxy groups, tert-butoxy groups, and alkoxy groups of stearic acid on its backbone.

Example 12

40 g of rice hull ash (as obtained in Example 1, containing about 30-38 g of silica) was added to a mixture consisting of 100-180 g of methanol, 60-100 g of isopropyl alcohol, 50-60 g ethanol (vinyl alcohol), 3.3 g of potassium hydroxide, 5-25 g of potassium oxide, and 140 g of acetone dimethyl acetal (2,2-dimethoxypropane) in a stainless steel autoclave of 1 L inner volume containing a magnetic stirrer stirring at 400 rpm. The autoclave was then sealed and heated up to a temperature in the range 180-260° C. by application of a microwave field and pressurized to about 1-2 MPa while being stirred at 400-800 rpm for 6-24 hours. Methanol, isopropyl alcohol, and ethanol reacted with the silicon oxides of the rice hull ash to form silicon alkoxides. The reaction was catalyzed by potassium hydroxide. Potassium oxide and acetone dimethyl acetal were used as dehydrating agents. After hydration, potassium oxide was converted into potassium hydroxide; acetone dimethyl acetal was converted into methanol and acetone. A silicon alkoxide blend in alcohol and acetone was then obtained, in which at least 90 mol % of the formed alkoxides contained no more than three silicon atoms. Greater than 50 mol % of the silicon alkoxides contained 3 different alkoxy groups, in this case methoxy groups, isopropoxy groups, and vinyloxy groups. Greater than 40 mol % of the silicon alkoxides contained 2 different alkoxy groups, in this case methoxy groups and isopropoxy groups. The autoclave was then cooled and kept to a temperature of 120-180° C. before the addition via injection of 5-7 g of di-tert-butyl peroxide (DTBP) to the silicon alkoxide blend formed inside while being stirred at 200-700 rpm for 15 minutes after which the stirring was stopped. The temperature was kept at 120-180° C. for 48 hours. The autoclave was then cooled and kept to a temperature of 50-60° C. before the addition via injection of 18-50 g of water containing 10 g of diethylene glycol monooctyl ether a surfactant to the polymerized silicon alkoxide blend formed inside while being stirred at 200-700 rpm for 1-15 minutes after which the stirring was stopped. The application of microwaves continued in order to keep the reaction medium, now a sol-gel material, at a temperature of 50-60° C. for 6-24 hours to induce complete gelation, polymerization, aging, and hydrophobization. The liquid phase of the system was then extracted at ambient pressure and a temperature of 150-170° C. for 3 hours by application of a microwave field. Alcohol and acetone that were removed from the system during the aerogel production process were collected (vapors were condensed back to liquid phase) and used to produce new alkoxides and sols. The resulting aerogels came mainly in the form of monoliths and chunks. The aerogels had an envelope density of about 100-150 kg/$m^3$, a porosity larger than 90%, a BET specific surface are of about 500-700 $m^2$/g, a 24-h water uptake of less than 10%, a surface contact angle of greater than 110°, and a thermal conductivity of about 18-35 mW/m-K.

Example 12-A 40 g of rice hull ash (as obtained in Example 6) was added to a mixture consisting of 100 g of methanol, 60 g of isopropyl alcohol, 50 g ethanol (vinyl alcohol), 3.3 g of potassium hydroxide, 5 g of potassium oxide, and 140 g of acetone dimethyl acetal (2,2-dimethoxypropane) in a stainless steel autoclave of 1 L inner volume containing a magnetic stirrer stirring at 600 rpm. The autoclave was then sealed and charged with carbon dioxide to a pressure of 2.5 MPa before being heated up to a temperature of 260° C. for 24 hours. Methanol, isopropyl alcohol, and ethanol reacted with the silicon oxides of the rice hull ash to form silicon alkoxides. The reaction was catalyzed by potassium hydroxide. Potassium oxide and acetone dimethyl acetal were used as dehydrating agents. After hydration, potassium oxide was converted into potassium hydroxide; acetone dimethyl acetal was converted into methanol and acetone. A silicon alkoxide blend in alcohol and acetone was then obtained. The autoclave was then cooled and kept to a temperature of 90° C. before the addition via injection of 5 g of di-tert-butyl peroxide (DTBP) to the silicon alkoxide blend formed inside while being stirred at 400 rpm for 15 minutes after which the stirring was stopped. The temperature was kept at 90° C. for 48 hours. The autoclave was then cooled and kept to a temperature of 50° C. before the addition via injection of 40 g of water containing 10 g of diethylene glycol monooctyl ether a surfactant to the polymerized silicon alkoxide blend formed inside while being stirred at 500 rpm for 15 minutes after which the stirring was stopped. The application of microwaves continued in order to keep the reaction medium, now a sol-gel material, at a temperature of 50° C. for 24 hours to induce complete gelation, polymerization, aging, and hydrophobization. The liquid phase of the system was then extracted at ambient pressure and a temperature of 150-170° C. for 30 minutes by application of a microwave field. Alcohol and acetone that were removed from the system during the aerogel production process were collected (vapors were condensed back to liquid phase) and used to produce new alkoxides and sols. The resulting aerogel particles had an envelope density of about 100-120 $kg/m^3$, a porosity larger than 50%, a BET specific surface are of about 450 $m^2/g$, a 24-h water uptake of less than 20%, a surface contact angle of greater than 110°, and a thermal conductivity of about 31 mW/m-K.

Example 13

Aerogels were produced according to the same procedure described in Example 1 with the exception of the composition of reaction mixture to produce the silicon alkoxide blend. n-butanol and tert-butanol were used instead of methanol and isopropyl alcohol, respectively. A net envelope volume shrinkage less than 20% was measured for the obtained aerogels. The aerogels had an envelope density of about 100-150 $kg/m^3$, a porosity larger than 90%, a BET specific surface are of about 500-700 $m^2/g$, a 24-h water uptake of less than 10%, a surface contact angle of greater than 110°, and a thermal conductivity of about 18-35 mW/m-K. The aerogel had butoxy groups, tert-butoxy groups, and alkoxy groups of stearic acid on its backbone.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

What is claimed is:

1. A method for manufacturing an aerogel, the method comprising reacting a silica source with a mixture comprising:

(i.) methanol and/or ethanol and (ii.) one or more C3-C5 alcohols, (iii.) optionally a fatty acid, and (iv.) optionally an organic polymer, thereby forming a silicon alkoxide comprising:

(v.) a methoxy group and/or an ethoxy group, and (vi.) one or more C3-C5 alkoxy groups, and (vii.) optionally a fatty acid ester group;

hydrolyzing the silicon alkoxide;

forming a silica gel from the hydrolyzed silicon alkoxide; and drying the silica gel to produce an aerogel;

wherein the degree of the hydrolysis is such that at least some of the alkoxy groups of the silicon alkoxide are present on the solid network of the resulting aerogel.

2. The method of claim 1, wherein the silica source comprises silica derived from rice husk, silica sand, silica derived from glass, and/or silica derived from glass fiber.

3. The method of claim 1, wherein the one or more $C_3$-$C_5$ alcohols are selected from the group consisting of isopropanol, n-propanol, tert-butanol, sec-butanol, n-butanol, amyl alcohol, or the organic polymer is a polyol, or the organic polymer is a polyvinyl alcohol.

4. The method of claim 1, wherein the molar ratio of i) methanol and/or ethanol to ii) one or more $C_3$-$C_5$ alcohols in the mixture is between 1:1 and 4:1, or between 2:1 and 3:1.

5. The method of claim 1, wherein the one or more $C_3$-$C_5$ alkoxy group are selected from the group consisting of isopropoxy group, n-propoxy group, tert-butoxy group, sec-butoxy group, n-butoxy group, and amyloxy group.

6. The method of claim 1, wherein the silicon alkoxide comprises a methoxy group and an isopropoxy group.

7. The method of claim 1, wherein:

drying is performed at ambient pressure;

drying is performed in the presence of microwave radiation; and/or drying is performed by supercritically extracting the pore fluid from the silica gel.

8. The method of claim 1, wherein the aerogel comprises an alkoxy group on its surface.

9. The method of claim 1, wherein the aerogel comprises an isopropoxy group on its surface.

10. The method of claim 1, wherein:

the aerogel exhibits a surface contact angle of greater than 100°; and/or the aerogel exhibits a 24-h water uptake of less than 15%.

11. The method of claim 1, wherein:

a hydrophobic group is attached to the silica gel with the assistance of microwave radiation, and/or a hydrophobic group is attached to the silica gel at supercritical conditions.

12. The method of claim 1, wherein formation of the silicon alkoxide is performed in the presence of desiccant and/or a water scavenger.

13. The method of claim 12, wherein the desiccant and/or water scavenger is hydrated to a basic or acidic component to alter the pH of the system when water is added back to the system to induce hydrolysis of the alkoxides.

14. The method of claim 1, wherein formation of the silicon alkoxide is performed in the presence of a catalyst comprising or selected from a base, an ammonium salt, a fluoride compound, and mixtures thereof.

15. The method of claim 1, wherein the base is selected from the group consisting of an alkali metal hydroxide, an alkaline earth metal hydroxide, ammonia, ammonium hydroxide, a primary amine, a secondary amine, a tertiary amine, a quaternary amine compound, and mixtures thereof.

16. The method of claim 14, wherein hydrolysis of the silicon alkoxide and/or formation of the silica gel is catalyzed by the catalyst in the formation of the silicon alkoxide.

17. The method of claim 16, wherein hydrolysis of the silicon alkoxide and/or formation of the silica gel is catalyzed by the base to catalyze formation of the silicon alkoxide.

18. The method of claim 1, the method further comprising the step of recovering a hydroxyl-containing organic molecule resulting from hydrolysis of the silicon alkoxide and/or from formation of the silica gel; and using the recovered hydroxyl-containing organic molecule to make another silicon alkoxide, optionally wherein recovery of the hydroxyl-containing organic molecule is performed in the presence of a desiccant and/or water scavenger.

19. The method of claim 18, wherein recovery of the hydroxyl-containing organic molecule is performed in the presence of a desiccant and/or water scavenger.

20. A method for manufacturing a silica aerogel, the method comprising reacting a silica source with one or more hydroxyl-containing organic molecules, thereby forming a silicon alkoxide;

hydrolyzing the silicon alkoxide;

forming a silica gel from the hydrolyzed silicon alkoxide;

and drying the silica gel to produce a silica aerogel;

the method further comprising recovering a hydroxyl-containing organic molecule resulting from hydrolysis of the silicon alkoxide and/or from formation of the silica gel;

and using the recovered hydroxyl-containing organic molecule to make another silicon alkoxide.

* * * * *